(12) United States Patent
Okumura

(10) Patent No.: US 10,620,511 B2
(45) Date of Patent: Apr. 14, 2020

(54) PROJECTION DEVICE, PROJECTION SYSTEM, AND INTERFACE APPARATUS

(71) Applicant: NEC Corporation, Minato-ku, Tokyo (JP)

(72) Inventor: Fujio Okumura, Tokyo (JP)

(73) Assignee: NEC CORPORATION, Tokyo (JP)

(*) Notice: Subject to any disclaimer, the term of this patent is extended or adjusted under 35 U.S.C. 154(b) by 112 days.

(21) Appl. No.: 15/735,272

(22) PCT Filed: Jun. 17, 2016

(86) PCT No.: PCT/JP2016/002931
§ 371 (c)(1),
(2) Date: Dec. 11, 2017

(87) PCT Pub. No.: WO2016/208171
PCT Pub. Date: Dec. 29, 2016

(65) Prior Publication Data
US 2018/0173082 A1    Jun. 21, 2018

(30) Foreign Application Priority Data

Jun. 23, 2015  (JP) ................................ 2015-125298

(51) Int. Cl.
*G03B 21/00* (2006.01)
*G09G 3/20* (2006.01)
(Continued)

(52) U.S. Cl.
CPC ............ *G03B 21/005* (2013.01); *G03H 1/16* (2013.01); *G03H 1/22* (2013.01); *G03H 1/2205* (2013.01);
(Continued)

(58) Field of Classification Search
CPC .. G03H 1/16; G03H 1/22; G09G 3/20; G09G 5/00; H04N 5/74
See application file for complete search history.

(56) References Cited

U.S. PATENT DOCUMENTS

| 2010/0118359 A1* | 5/2010 | Leister | G03H 1/0808 |
| | | | 359/9 |
| 2013/0222384 A1* | 8/2013 | Futterer | G02B 5/32 |
| | | | 345/426 |
| 2015/0286187 A1* | 10/2015 | Collings | G03H 1/0808 |
| | | | 359/9 |

FOREIGN PATENT DOCUMENTS

| JP | H10-222046 A | 8/1998 |
| JP | 2001-188460 A | 7/2001 |

(Continued)

OTHER PUBLICATIONS

C. Pinhanez, "Everywhere Displays Projector: A Device to Create Ubiquitous Graphical Interfaces" Ubicomp 2001: Ubiquitous Computing, pp. 315-331.

(Continued)

*Primary Examiner* — Isiaka O Akanbi
*Assistant Examiner* — Danell L Owens

(57) ABSTRACT

A projection device is provided in order to improve contrast of a target image projected by using a phase modulation type spatial modulation element and also preventing unnecessary light from being projected. The projection device includes: a projection means that includes a light source, a spatial modulation element including a display part that displays a phase distribution of a target image and reflecting light from the light source, and an opening frame through which reflected light from the spatial modulation element passes; and a control means that causes the display part of the spatial modulation element to display a phase distribution generated by performing iterative Fourier transform processing by (Continued)

using an amplitude distribution set with a signal region in which a basic figure included in the target image is arranged and a sweep-out region for sweeping optical noise out of the signal region.

18 Claims, 24 Drawing Sheets

(51) Int. Cl.
*G09G 5/00* (2006.01)
*H04N 9/31* (2006.01)
*G06F 3/03* (2006.01)
*G03H 1/22* (2006.01)
*G03H 1/16* (2006.01)
*H04N 5/74* (2006.01)
*G03H 1/08* (2006.01)
*G03B 21/20* (2006.01)

(52) U.S. Cl.
CPC ......... *G03H 1/2294* (2013.01); *G06F 3/0304* (2013.01); *G09G 3/20* (2013.01); *G09G 5/00* (2013.01); *H04N 5/74* (2013.01); *H04N 9/3179* (2013.01); *G03B 21/2033* (2013.01); *G03H 2001/0825* (2013.01); *G03H 2001/2218* (2013.01); *G03H 2225/32* (2013.01); *G09G 2340/0464* (2013.01); *G09G 2340/0492* (2013.01)

(56) References Cited

FOREIGN PATENT DOCUMENTS

| JP | 2010-521004 A | 6/2010 |
| JP | 2014-511500 A | 5/2014 |
| JP | 2014-206710 A | 10/2014 |
| WO | 2013/111374 A1 | 8/2013 |

OTHER PUBLICATIONS

Kyoji Matsushima et al., "A Diffractive Optical Element Designed for Arbitrary Pattern Beam Shaping by Use of Iterative Optimization Algorithm," The review of laser engineering, vol. 35, No. 5, 2007, pp. 299 to 308.

International Search Report for PCT Application No. PCT/JP2016/002931, dated Aug. 30, 2016.

English translation of Written opinion for PCT Application No. PCT/JP2016/002931.

\* cited by examiner

Fig.11
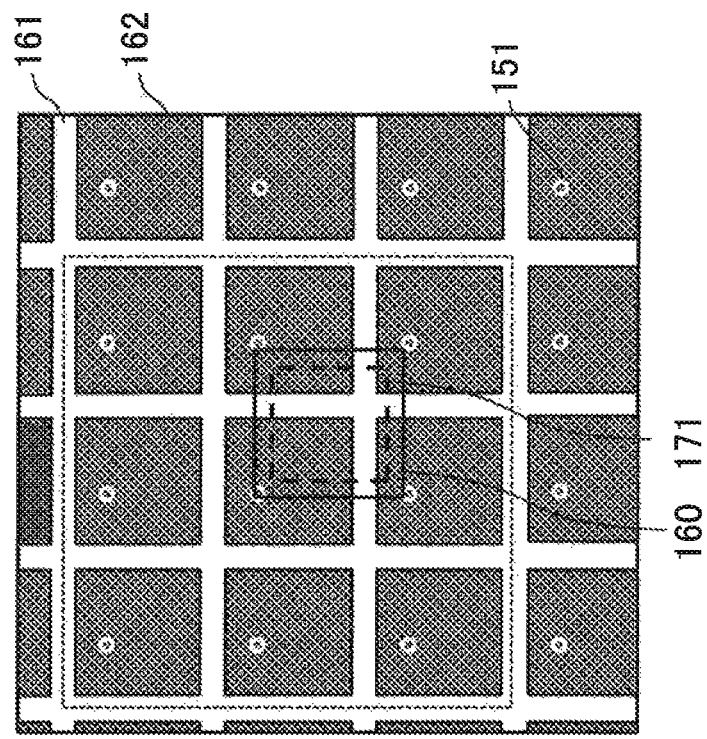
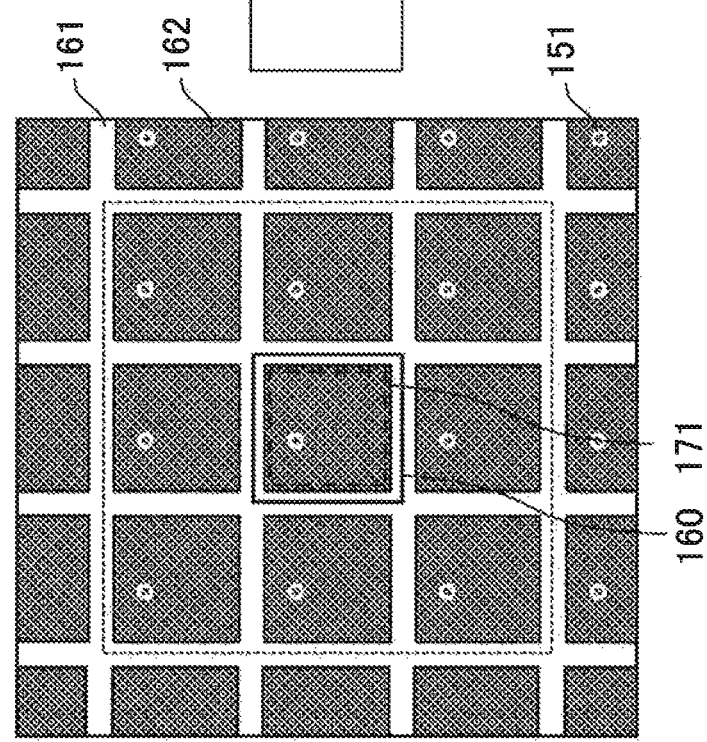

Fig.15
501 BASIC IMAGE TABLE
| IDENTIFIER | BASIC PATTERN | DISPLAY POSITION | ... | PHASE DISTRIBUTION (TARGET IMAGE) |
|---|---|---|---|---|
| A11 | ○ | 11 | ... | 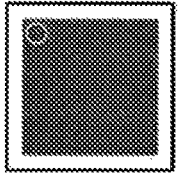 |
| A12 | ○ | 12 | ... | 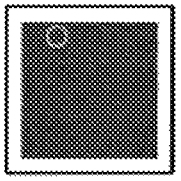 |
| ... | ... | ... | ... | ... |
| A66 | ○ | 66 | ... | 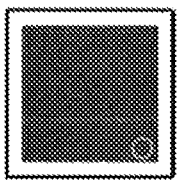 |

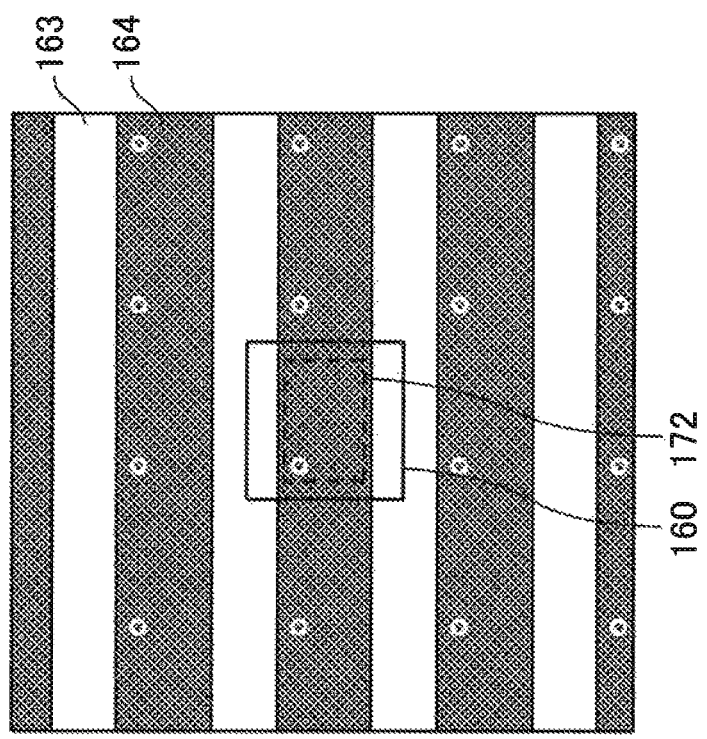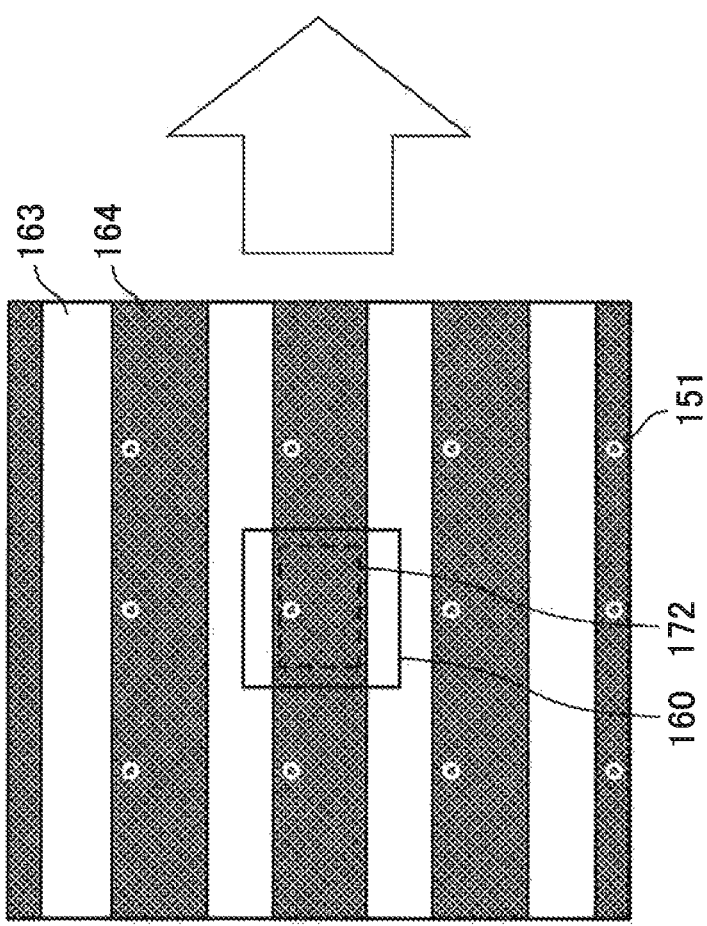
Fig.17

Fig.21
502 BASIC IMAGE TABLE
| IDENTIFIER | BASIC PATTERN | DISPLAY POSITION | ... | PHASE DISTRIBUTION (TARGET IMAGE) |
|---|---|---|---|---|
| A1 | ○ | 1 | ... | 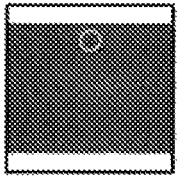 |
| A2 | ○ | 2 | ... | 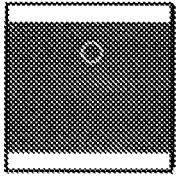 |
| ... | ... | ... | ... | ... |
| A7 | ○ | 7 | ... | 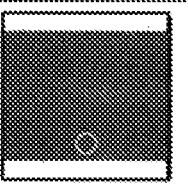 |

PROJECTION DEVICE, PROJECTION SYSTEM, AND INTERFACE APPARATUS

This application is a National Stage Entry of PCT/JP2016/002931 filed on Jun. 17, 2016, which claims priority from Japanese Patent Application 2015-125298 filed on Jun. 23, 2015, the contents of all of which are incorporated herein by reference, in their entirety.

TECHNICAL FIELD

The present invention relates to a projection device including a phase modulation type spatial modulation element, a projection system, and an interface apparatus.

BACKGROUND ART

Development of an interface apparatus combining a projector with a camera has been under way in recent years. Such an interface apparatus provides an interactive operation by detecting, with a camera, a manipulation performed on an image projected from a projector. NPL 1 discloses an interface apparatus combining a projector with a camera.

When a phase modulation type spatial modulation element is used in a projector in an interface apparatus, a phase distribution related to a displayed image is displayed on a display surface of the spatial modulation element. A desired displayed image can be displayed on a projection surface by projecting reflected light of light irradiated on the display surface of the spatial modulation element. A phase distribution displayed on the spatial modulation element is formed one by one by using arithmetic processing such as an iterative Fourier transform method. Accordingly, an amount of calculation may become enormous and may cause delay in the processing when a projection environment is changed or a dynamic image is displayed.

PTL 1 discloses a dynamic image hologram display device enabling generation and reproduced display of a dynamic image hologram. The device in PTL 1 enables to generate an interference fringe of a target object after a specific time period, without recalculating a hologram, and therefore enables to provide high speed hologram calculation, and generation and reproduced display of a dynamic image hologram in real time.

Normally, in order to display basic figures such as a circle and a rectangle at a plurality of positions, a phase distribution related to a displayed image in which a basic figure is arranged at each position needs to be prepared. In a simple pattern, a basic figure can be moved to any position by performing a shift operation on a phase distribution related to the basic figure. Accordingly, by preparing one phase distribution related to a basic figure, the basic figure can be displayed at any position by performing a shift operation on the phase distribution. Thus, assuming that a shift operation is performed, a storage capacity on the device side can be reduced. Meanwhile, when a shift operation is performed on a phase distribution related to a basic figure, a part other than the basic figure may look as though the part is studded with optical noise in a displayed image projected by using the phase distribution, and contrast may be reduced.

NPL 2 discloses a method of improving contrast of a displayed image by setting a signal region aiming at convergence of a light intensity to a target pattern and setting a range provided with a degree of freedom except for the signal region, when performing an iterative Fourier operation.

CITATION LIST

Patent Literature

[PTL 1] Japanese Unexamined Patent Application Publication No. H10-222046

Non Patent Literature

[NPL 1] C. Pinhanez, "Everywhere Displays Projector," (online), IBM, searched on May 7, 2014, Internet <URL: http://www.research.ibm.com/people/p/pinhanez/publications/ubico mp01.pdf>

[NPL 2] Kyoji Matsushima and Takashi Morimura, "A Diffractive Optical Element Designed for Arbitrary Pattern Beam Shaping by Use of Iterative Optimization Algorithm," The review of laser engineering, Vol. 35, No. 5, 2007, pp. 299 to 308

SUMMARY OF INVENTION

Technical Problem

In a Fresnel region corresponding to a near-field region in a liquid crystal on silicon (LCOS) or a diffractive optical element, a displayed image on a projected image can be moved by moving a displayed image on a display surface of the LCOS or the diffractive optical element. Accordingly, in the Fresnel region, by using the technique in PTL 1, a desired projected image can be formed by performing translation processing or rotation processing on an interference fringe for each group making an identical movement, and subsequently integrating the interference fringes of all the groups.

However, with regard to a Fraunhofer region, a projected image cannot be moved even when a displayed image is moved on a display surface by applying the technique in PTL 1. Accordingly, when the Fraunhofer region is used, there is a problem that processing by classification into groups making identical movements, as is the case with PTL 1, does not lead to reduction of an amount of calculation. Further, there is a problem in the technique in PTL 1 that a focal position of a projected image is fixed, and therefore a focus-free projected image cannot be formed.

There is a problem in NPL 2 that, while contrast of a displayed image can be improved, unnecessary optical noise swept out of a signal region is displayed when a shift operation is performed.

An object of the present invention is to provide a projection device solving the aforementioned problems by improving contrast of a target image projected by using a phase modulation type spatial modulation element, and preventing unnecessary optical noise from being displayed.

Solution to Problem

A projection device according to the present invention includes: a projection means that includes a light source, a spatial modulation element including a display part that displays a phase distribution of a target image and reflecting light from the light source, and an opening frame through which reflected light from the spatial modulation element passes; and a control means that causes the display part of the spatial modulation element to display a phase distribution generated by performing iterative Fourier transform processing by using an amplitude distribution set with a signal region in which a basic figure included in the target image is arranged and a sweep-out region for sweeping optical noise out of the signal region.

A projection system according to the present invention includes: a projection device including a projection means that includes a light source, a spatial modulation element including a display part that displays a phase distribution of a target image and reflecting light from the light source, and an opening frame through which reflected light from the spatial modulation element passes, and a control means that causes the display part of the spatial modulation element to display a phase distribution generated by performing iterative Fourier transform processing by using an amplitude distribution set with a signal region in which a basic figure included in the target image is arranged and a sweep-out region for sweeping optical noise out of the signal region; and a basic image generation means that sets a signal region and a sweep-out region into an amplitude distribution of a basic image including a basic figure, and generates, by iterative Fourier transform processing, a phase distribution of a basic image in which the basic figure is arranged at some position in the signal region.

An interface apparatus according to the present invention includes: an imaging device capturing a manipulation region in which an interface manipulation is performed; a projection device including a projection means that includes a light source, a spatial modulation element including a display part that displays a phase distribution of a target image and reflecting light from the light source, and an opening frame through which reflected light from the spatial modulation element passes, and a control means that causes the display part of the spatial modulation element to display a phase distribution generated by performing iterative Fourier transform processing by using an amplitude distribution set with a signal region in which a basic figure included in the target image is arranged and a sweep-out region for sweeping optical noise out of the signal region; and a control device acquiring an image captured by the imaging device, recognizing a manipulation by a manipulator, the manipulation being included in the image, and performing control of causing the projection device to project the target image, based on the recognition result.

Advantageous Effects of Invention

The present invention is able to provide a projection device capable of improving contrast of a projected target image by using a phase modulation type spatial modulation element, and preventing unnecessary light from being projected.

BRIEF DESCRIPTION OF DRAWINGS

FIG. 11 is a conceptual diagram illustrating an example of performing translation processing on a basic figure in a displayed image set with sweep-out regions on four sides, by a common technique.

FIG. 15 is a conceptual diagram illustrating an example of a basic image table stored by a basic image storage unit in the projection device according to the first example embodiment of the present invention.

FIG. 17 is a conceptual diagram illustrating an example of suitably performing translation processing on a basic figure in a displayed image set with sweep-out regions on two sides, by a conversion processing unit in a projection device according to a second example embodiment of the present invention.

FIG. 21 is a conceptual diagram illustrating an example of a basic image table stored by a basic image storage unit in the projection device according to the second example embodiment of the present invention.

DESCRIPTION OF EMBODIMENTS

Example embodiments of the present invention will be described below using drawings. However, while a technically preferable limitation for implementing the present invention is imposed on the example embodiments described below, the limitation does not limit the scope of the invention to the following. Note that, in all diagrams used for description of the following example embodiments, unless there is a specific reason, a same reference sign is given to similar parts, and repeated description of a similar configuration or operation may be omitted.

First Example Embodiment (Configuration)

First, a configuration of a projection device 1 according to a first example embodiment of the present invention will be described referring to drawings.

Figure 1:
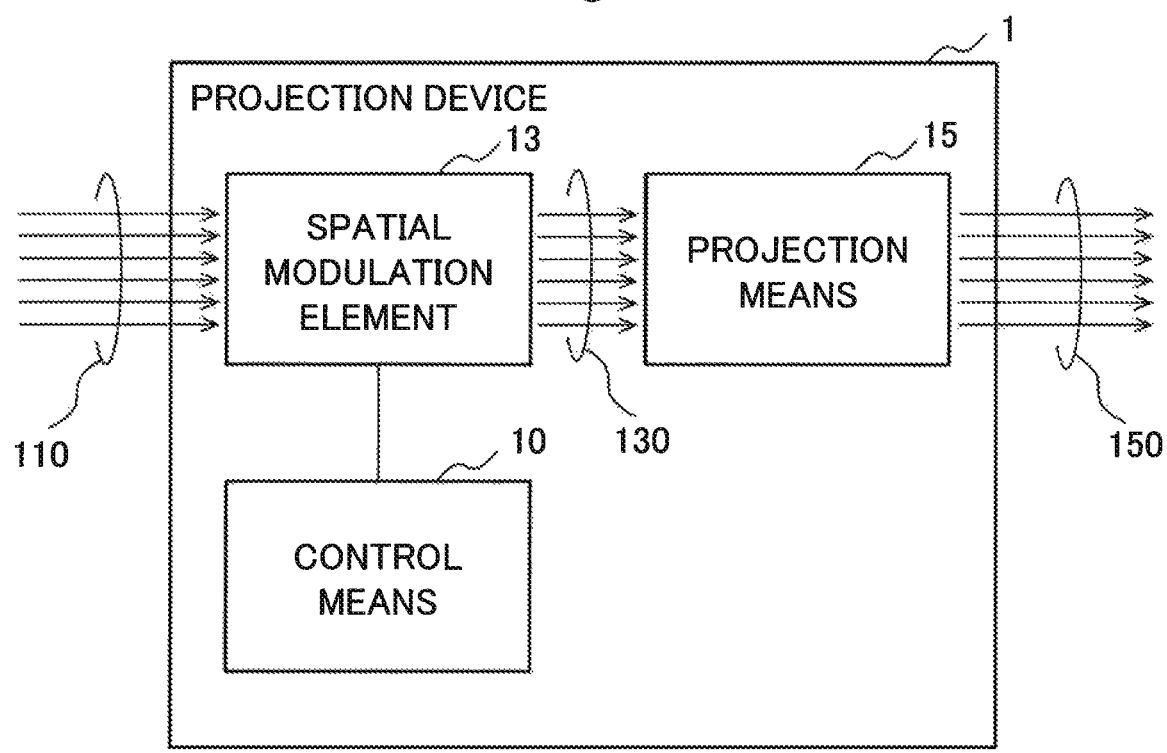
FIG. 1 is a block diagram illustrating a configuration of a projection device according to a first example embodiment of the present invention.

FIG. 1 is a block diagram illustrating a configuration of the projection device 1 according to the present example embodiment. As illustrated in FIG. 1, the projection device 1 according to the present example embodiment includes a control means 10, a spatial modulation element 13, and a projection means 15.

The control means 10 takes information (hereinafter referred to as target image information) related to a projected image (also referred to as a target image) as an input from an upper system such as a server. Based on the input target image information, the control means 10 generates a phase distribution for forming on a projection surface a light intensity distribution related to the target image (hereinafter referred to as a phase distribution of the target image). Furthermore, the control means 10 may acquire target image information input by a user. While a case of a basic image constituting a target image being single will be hereinafter described, when a target image includes a plurality of basic figures, a desired target image may be formed by compositing a plurality of basic images related to the respective basic figures.

The target image information includes information about a basic image constituting a target image. For example, the basic image is an image including at least one figure being basic (hereinafter referred to as a basic figure) such as a circle such as "o," a polygon such as "▲" and "□," a mark such as "♣" and "*," and a character such as "A" and "B." Furthermore, without being limited to the figure listed above, any figure may be used as the basic figure.

The control means 10 stores a phase distribution of a basic image included in target image information input by an upper system or a user. For example, a phase distribution of a basic image stored by the control means 10 is previously generated in a server or a computer connected through a network such as an intranet or the Internet.

The control means 10 extracts a phase distribution of a basic image constituting a target image, based on input target image information, and generates a phase distribution of the target image by using the extracted phase distribution of the basic image.

The control means 10 controls the spatial modulation element 13 in such a way that a parameter deciding a difference between a phase of laser light irradiated on a display part of the spatial modulation element 13 and a phase of laser light reflected on the display part is changed. For example, the parameters deciding a difference between a phase of laser light irradiated on the display part in the spatial modulation element 13d and a phase of laser light reflected on the display part include parameters related to optical characteristics such as a refractive index and an optical path length.

For example, the control means 10 changes a refractive index of the display part by controlling voltage applied to the spatial modulation element 13. Consequently, laser light irradiated on the display part is appropriately diffracted based on the refractive index of the display part. In other words, a phase distribution of the laser light irradiated on the spatial modulation element 13 is modulated depending on an optical characteristic of the display part. Note that the control of the spatial modulation element 13 by the control means 10 is not limited to the description above.

The control means 10 stores a phase distribution of a basic image generated by iterative Fourier transform processing with an amplitude distribution of the basic image constituting a target image and a predetermined phase distribution as initial values. Upon input of target image information, based on basic image information included in the input target image information, the control means 10 generates a phase distribution of the target image by using a phase distribution of a basic image stored in the control means 10. Further, the control means 10 controls the phase modulation type spatial modulation element 13, based on the generated phase distribution of the target image.

Figure 2:
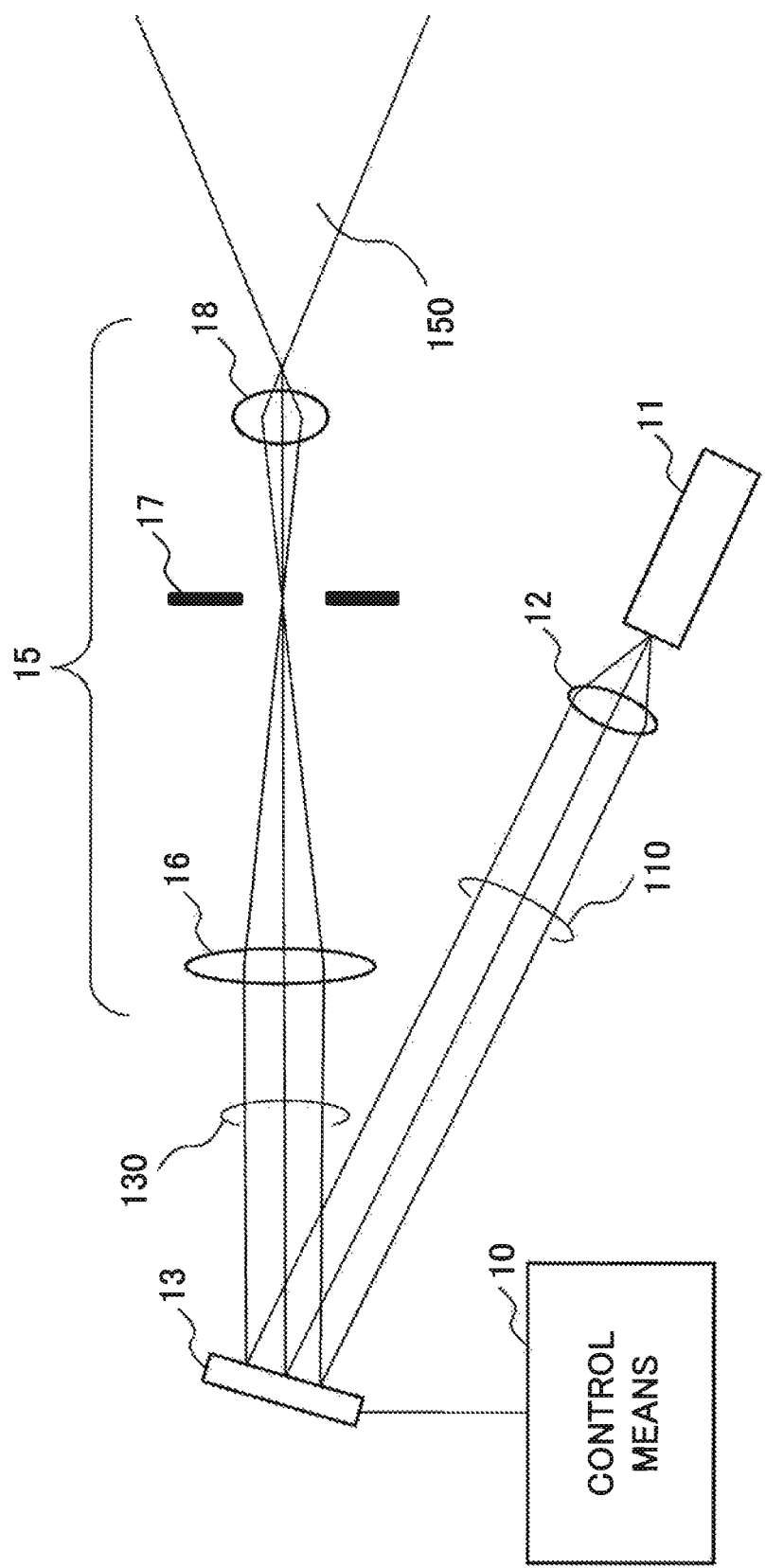
FIG. 2 is a conceptual diagram illustrating a configuration of an optical system of the projection device according to the first example embodiment of the present invention.

FIG. 2 is a conceptual diagram for illustrating an optical configuration of the projection device 1 according to the present example embodiment. As illustrated in FIG. 2, a collimator lens 12 turns laser light emitted by a light source 11 into laser light 110 with an aligned wave front, and irradiates the laser light on the display part of the spatial modulation element 13, according to the present example embodiment. Furthermore, it is preferable that the control means 10 control an intensity of the laser light output by the light source 11, depending on brightness of an image displayed on the display part of the spatial modulation element 13, and the like.

The spatial modulation element 13 receives incident laser light 110 with an aligned wave front and includes a phase modulation type spatial modulation element modulating a phase of the incident laser light 110. The spatial modulation element 13 emits toward the projection means 15 the modulated light 130 being modulated.

As illustrated in FIG. 2, the present example embodiment makes an incidence angle of laser light non-perpendicular to the display part of the spatial modulation element 13. Specifically, the present example embodiment makes an emission axis of laser light emitted from the light source 11 diagonal to the display part of the spatial modulation element 13. By setting the emission axis of the laser light 110 diagonal to the display part of the spatial modulation element 13, the laser light 110 can be launched into the spatial modulation element 13 without using a beam splitter, and therefore efficiency can be improved.

The spatial modulation element 13 includes the display part displaying a phase distribution. The display part of the spatial modulation element 13 displays a phase distribution for forming a target image on the projection surface. Modulated light 130 reflected by the display part of the spatial modulation element 13 becomes an image of a kind of diffraction gratings forming an aggregate, and a target image is formed by convergence of light diffracted by the diffraction gratings.

For example, the spatial modulation element 13 is provided by an element using a ferroelectric liquid crystal, a homogeneous liquid crystal, a homeotropic liquid crystal, or the like. For example, the spatial modulation element 13 is provided by a liquid crystal on silicon (LCOS) or a microelectromechanical system (MEMS).

The projection means 15 is an optical system projecting modulated light 130 reflected by the spatial modulation element 13 as projected light 150. As illustrated in FIG. 2, the projection means 15 includes a Fourier transform lens 16, an aperture 17, and a projection lens 18. The modulated light 130 modulated by the spatial modulation element 13 is projected as the projected light 150 by the projection means 15.

The Fourier transform lens 16 is an optical lens for forming at a nearby focal position an image formed when the modulated light 130 reflected by the display part of the spatial modulation element 13 is projected to infinity.

The aperture 17 is an opening frame on which an opening for eliminating higher order light included in light converged by the Fourier transform lens 16 and setting an extension of a target image displayed on the non-projection surface is formed.

The opening formed on the aperture 17 is formed smaller than an outer periphery of a zeroth-order component of a projected image at a position where the aperture 17 is installed. Accordingly, a peripheral region of the zeroth-order component and a component other than the zeroth-order component are blocked by the aperture 17 and are not projected on the projection surface. It is preferable that the aperture 17 be installed at a focal position of the Fourier transform lens 16. Furthermore, the installed position of the aperture 17 may be deviated from the focal position as long as a function of eliminating higher order light is exhibited.

Figure 3:
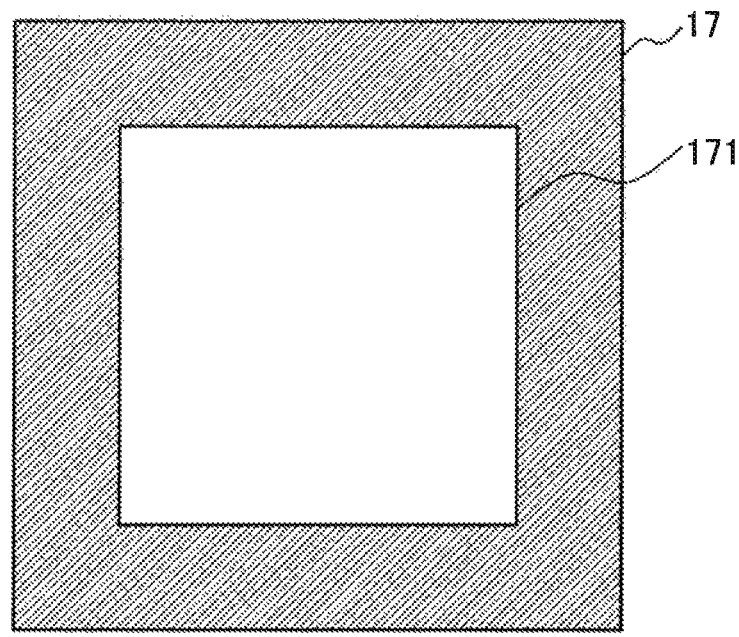
FIG. 3 is a conceptual diagram illustrating an example of an aperture included in the projection device according to the first example embodiment of the present invention.

FIG. 3 is a conceptual diagram of an example of the aperture 17. A rectangular opening is formed on the aperture 17. Furthermore, the opening on the aperture 17 may have any shape such as a circle, an ellipse, or a polygon.

Note that, while the opening of the aperture 17 itself cannot become a component, a reference sign such as an opening 171 will be hereinafter given thereto in order to facilitate description. Further, non-components other than the opening 171 such as a range of a zeroth-order component region, a projected target image, and a basic figure may be given reference signs in the description.

Figure 4:
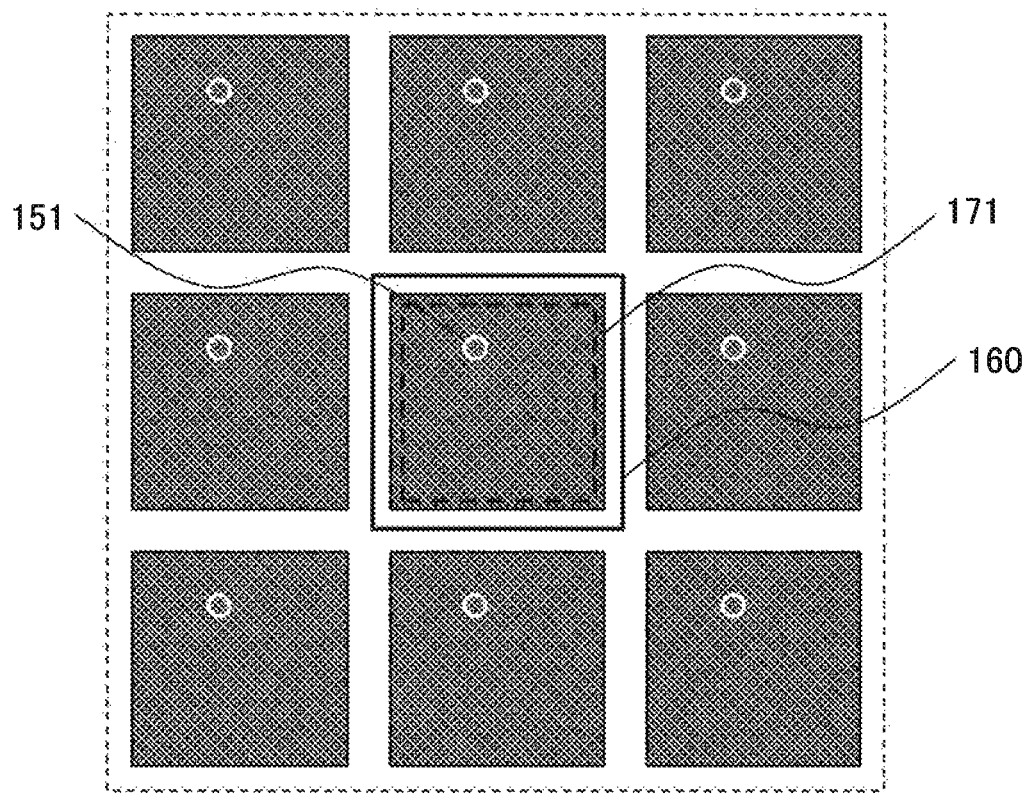
FIG. 4 is a conceptual diagram illustrating an example of a displayed image projected by the projection device according to the first example embodiment of the present invention.
Figure 5:
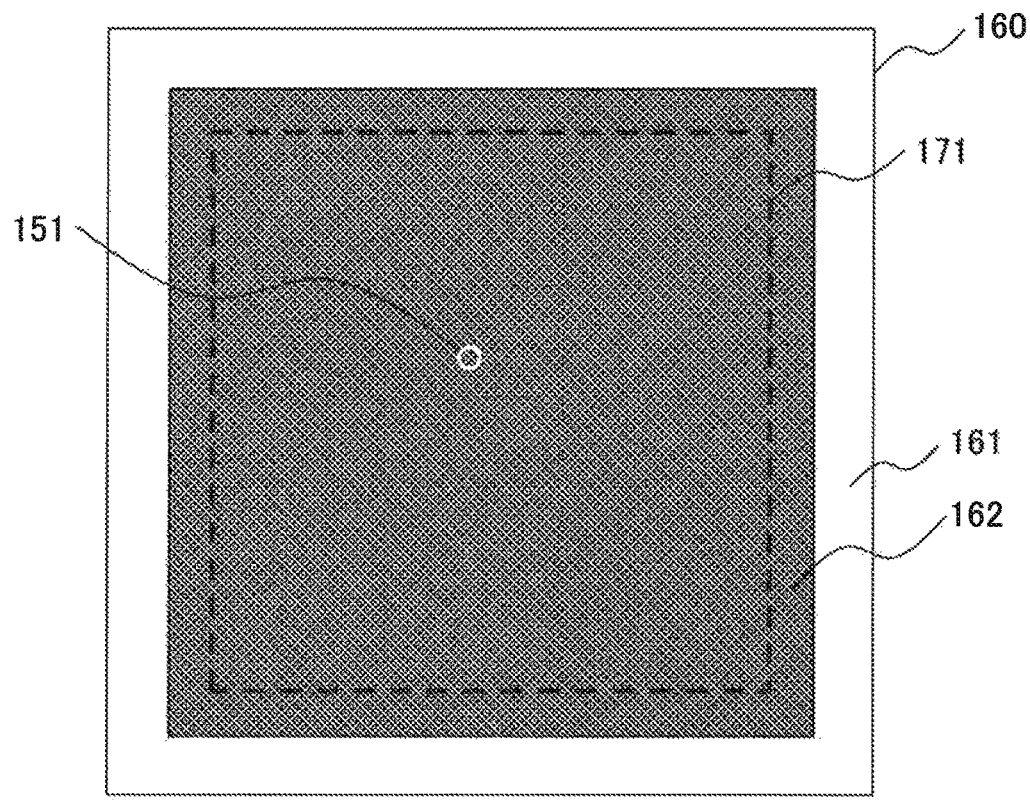
FIG. 5 is a conceptual diagram illustrating an example of displaying a basic figure on a projection surface by the projection device according to the first example embodiment of the present invention.

FIGS. 4 and 5 are conceptual diagrams for illustrating how the projected light 150 projected from the projection means 15 is displayed on the non-projection surface. In the examples in FIGS. 4 and 5, a target image including a circular basic FIG. 151 (○) is projected.

FIG. 4 illustrates a range of a zeroth-order component with a frame border in solid lines (hereinafter referred to as a zeroth-order region 160). FIG. 4 further illustrates in broken lines a range inside the zeroth-order region 160 (hereinafter referred to as the opening 171) in which an image projected through the opening of the aperture 17 is displayed on the projection surface. When projected through the aperture 17, a higher order component is shielded by the aperture 17, and an image within the range of the opening 171 is displayed on the projection surface. Note that the frame of the zeroth-order region 160 in solid lines and the frame of the opening 171 in broken lines are not actually displayed on the projection surface.

When the modulated light 130 emitted from the spatial modulation element 13 is projected without passing through the aperture 17, a higher order component composed of display information same as the zeroth-order component is displayed around the zeroth-order component. Note that, while only a first-order component is illustrated in a frame in dotted lines around the zeroth-order component in the example in FIG. 5, higher order components including the first-order component are actually projected in such a way to continue infinitely beyond the frame in dotted lines. A higher order component becomes darker as an order thereof becomes greater, and therefore actually becomes unrecognizable due to attenuation at a certain order.

FIG. 5 is a diagram extracting the inside of the zeroth-order region 160. When the modulated light 130 reflected by the display part of the spatial modulation element 13 passes the opening 171 through the Fourier transform lens 16, a higher order component thereof is shielded by the aperture 17, and an image in the opening 171 illustrated in FIG. 5 is displayed on the projection surface.

The projection lens 18 is an optical lens magnifying and projecting light converged by the Fourier transform lens 16. The projection lens 18 projects the projected light 150 in such a way that a target image related to a phase distribution input to the spatial modulation element 13 is displayed on the projection surface. Furthermore, when a size of a target image projected on the projection surface is not set, the projection lens 18 may be omitted.

(Control Means)

Next, the control means 10 according to the present example embodiment will be described.

First, a basic image handled by the control means 10 according to the present example embodiment will be described. The control means 10 handles a phase distribution of a basic image generated by using an amplitude distribution set with a signal region and a sweep-out region (hereinafter referred to as a basic image set with a sweep-out region). Note that a content of NPL 2 (Kyoji Matsushima and Takashi Morimura, "A Diffractive Optical Element Designed for Arbitrary Pattern Beam Shaping by Use of Iterative Optimization Algorithm," The review of laser engineering, Vol. 35, No. 5, 2007, pp. 299 to 308) is referred to in the following description.

The signal region is a region on which a constraint of converging to a target image is imposed in iterative Fourier transform processing calculating a phase distribution of a basic image. Further, the sweep-out region is a region to which optical noise is swept out, by allowing a degree of freedom in iterative Fourier transform processing. Referring to FIG. 5, the sweep-out region corresponds to a white-frame part (hereinafter referred to as a sweep-out region 161), and the signal region corresponds to a filled part (hereinafter referred to as a signal region 162). The iterative Fourier transform processing will be described in detail later. When optical noise is swept out to the sweep-out region, optical noise superposed on a desired image in the signal region is reduced, and therefore contrast of the image in the signal region is improved.

For example, the sweep-out region may be set on four sides of a basic image as illustrated in FIG. 5, may be set on two sides facing one another such as upper and lower sides or left and right sides of the basic image, or may be provided only on one side of the basic image. Further, the sweep-out region may be set in any part as long as the part does not block an image to be projected. A shape of the sweep-out region may be a rectangle as illustrated in FIG. 5, a circle, or any shape related to a shape of the opening on the aperture or the like.

Figure 6:
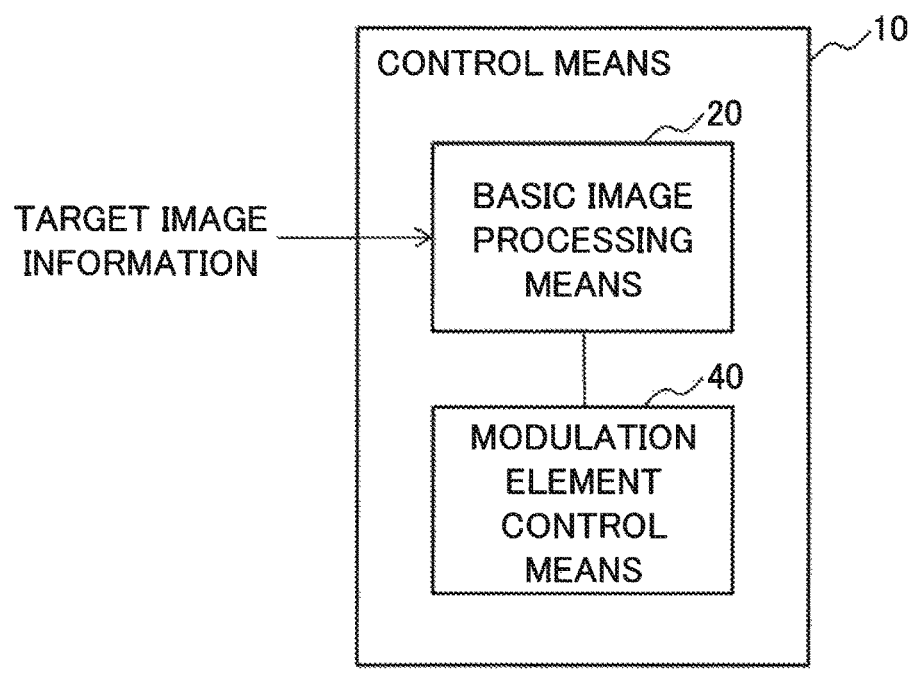
FIG. 6 is a block diagram illustrating a configuration of a control means in the projection device according to the first example embodiment of the present invention.

Next, a configuration of the control means 10 will be described referring to drawings. As illustrated in FIG. 6, the control means 10 includes a basic image processing means 20 and a modulation element control means 40.

The basic image processing means 20 acquires a phase distribution of a basic image set with a sweep-out region from an upper system and stores the acquired phase distribution. Further, based on the target image information acquired from the upper system, the basic image processing means 20 performs conversion processing on a basic figure on the basic image.

The modulation element control means 40 acquires a phase distribution generated by the basic image processing means 20 and controls the spatial modulation element 13, based on the phase distribution. For example, the modulation element control means 40 changes a refractive index of the display part of the spatial modulation element 13 by controlling voltage applied to the spatial modulation element 13.

(Basic Image Processing Means)

Figure 7:
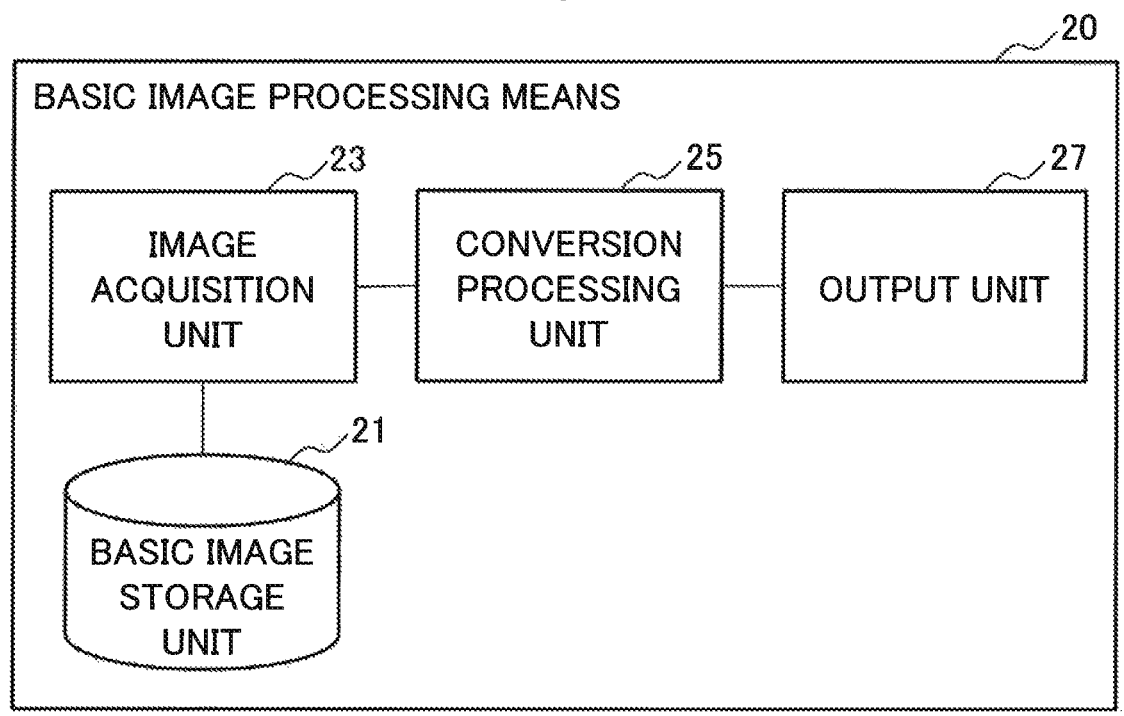
FIG. 7 is a block diagram illustrating a configuration of a basic image processing means included in the control means in the projection device according to the first example embodiment of the present invention.

Details of the basic image processing means 20 will be described here using drawings. As illustrated in FIG. 7, the basic image processing means 20 includes a basic image storage unit 21, an image acquisition unit 23, a conversion processing unit 25, and an output unit 27.

The basic image storage unit 21 stores a phase distribution having undergone iterative Fourier transform processing, correspondingly to each basic image. The basic image storage unit 21 stores a phase distribution of a basic image set with a sweep-out region as described above. Note that the phase distribution of the basic image is generated by a server constituting the upper system.

For example, the basic image storage unit 21 may store a phase distribution of each basic image correspondingly to a unique identifier (ID) given to each basic image. For example, the basic image storage unit 21 may be configured to include a storage area related to each of a plurality of basic images. Further, for example, the basic image storage unit 21 may be configured to include a storage area collectively storing phase distributions of a plurality of basic images. Furthermore, the basic image storage unit 21 may store a phase distribution of a basic image including a basic figure correspondingly to a unique identifier given to the basic figure.

The image acquisition unit 23 acquires a phase distribution of a basic image set with a sweep-out region from an upper system and causes the basic image storage unit 21 to record the phase distribution. Further, the image acquisition unit 23 takes target image information as an input and acquires a phase distribution related to a basic image included in the target image information from the basic image storage unit 21.

The target image information includes identification information for identifying a basic image included in a target image. Further, the target image information includes information about a state of a basic figure included in a basic image on a target image. The state of a basic figure refers to states such as a positional state and a rotational state of the basic figure on the target image.

The image acquisition unit 23 transmits a phase distribution of a basic image acquired from the basic image storage unit 21 to the conversion processing unit 25.

The conversion processing unit 25 performs conversion processing on a basic figure, based on target image information. For example, the conversion processing unit 25 performs conversion processing such as translation processing or rotation processing on a basic figure. Furthermore, when a basic image itself relates to a target image, the conversion processing unit 25 does not need to perform conversion processing on a phase distribution of the basic image.

The conversion processing unit 25 outputs a phase distribution of a basic image having undergone conversion processing to the output unit 27.

The conversion processing performed by the conversion processing unit 25 will be described here using examples in FIGS. 8 and 9. Note that, while the conversion processing unit 25 may actually convert a phase distribution of a basic image, a basic image itself related to a phase distribution being converted is used in FIGS. 8 and 9 in order to facilitate description.

Figure 8:
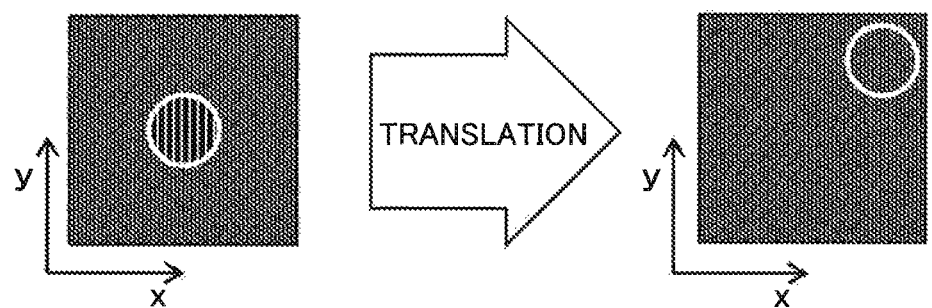
FIG. 8 is a conceptual diagram illustrating an example of performing translation processing on a basic figure by a conversion processing unit in the projection device according to the first example embodiment of the present invention.

FIG. 8 is an example of the conversion processing unit 25 translating a basic figure (circle) from a center of a target image toward an upper-right corner. For example, by performing an operation by a phase shift operation (translation processing) on a phase distribution of a basic image including the basic figure (circle), the conversion processing unit 25 is able to translate the basic figure (circle) in the target image. For example, in the phase shift operation, a phase of the basic image may be shifted by multiplying the phase by a phase matrix in each direction of an x-direction and a y-direction.

Figure 9:
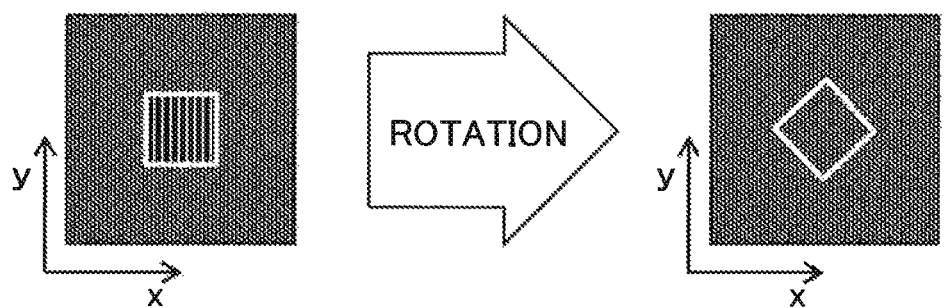
FIG. 9 is a conceptual diagram illustrating an example of performing rotation processing on a basic figure by the conversion processing unit in the projection device according to the first example embodiment of the present invention.

FIG. 9 is an example of the conversion processing unit 25 rotating a basic figure (rectangle) on a target image. For example, by performing an operation (rotation processing) of rotating a phase distribution of a basic image including the basic figure (rectangle), the conversion processing unit 25 is able to rotate the basic figure (rectangle) on the target image. Each type of the processing illustrated in FIGS. 8 and 9 may be freely combined. Note that the processing illustrated in each of FIGS. 8 and 9 is an example and does not completely cover processing performed by the conversion processing unit 25.

The output unit 27 outputs a phase distribution of a target image on which conversion processing is performed by the conversion processing unit 25 to the modulation element control means 40.

A limitation in performing translation processing will be described here for both cases of a sweep-out region being set and not being set.

Figure 10:
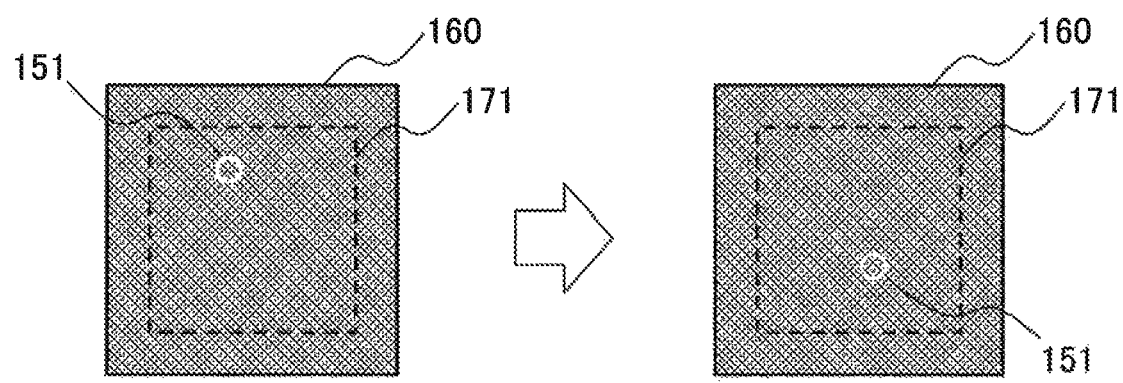
FIG. 10 is a conceptual diagram illustrating an example of performing translation processing on a basic figure in a displayed image not set with a sweep-out region, by a common technique.

FIG. 10 is a conceptual diagram for illustrating translation processing when a sweep-out region is not set. In a basic image including a basic figure being a circle (○) in the example in FIG. 10, translation processing is performed on the basic figure. In a case that a sweep-out region is not set, as illustrated in FIG. 10, a sweep-out region itself does not exist regardless of which part in the basic image the basic figure is translated to. Accordingly, an incident of unnecessary optical noise swept out to a sweep-out region being displayed on the projection surface does not occur. However, optical noise on the target image is not removed, and therefore contrast of the displayed target image is not improved.

Figure 12:
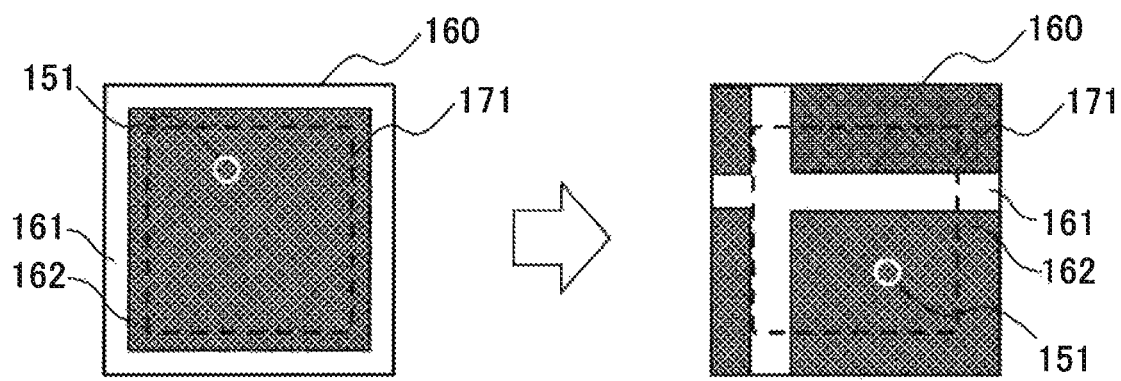
FIG. 12 is a conceptual diagram illustrating an example of performing translation processing on a basic figure in a displayed image set with sweep-out regions on four sides, by a common technique.
Figure 13:
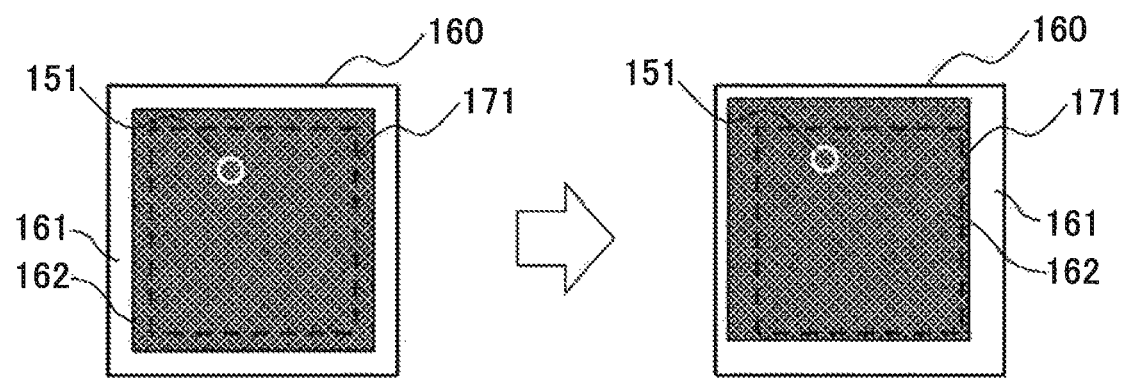
FIG. 13 is a conceptual diagram illustrating an example of performing translation processing on a basic figure in a displayed image set with sweep-out regions on four sides, by the conversion processing unit in the projection device according to the first example embodiment of the present invention.

FIGS. 11 to 13 are examples of performing translation processing on a basic image set with sweep-out regions on four sides.

When translation processing is performed on a basic image set with sweep-out regions as illustrated in FIG. 11, the translation processing is performed on an entire image including a higher order component. Furthermore, in FIG. 11, an area around a region including a zeroth-order component and a first-order component is illustrated by dotted lines so that it is readily understandable that, when translation processing is performed on the basic image, the translation processing is performed on the entire image.

FIG. 12 is a conceptual diagram extracting only a zeroth-order region 160 in which a zeroth-order component is displayed in an example similar to FIG. 11. In common translation processing, when an amount of movement of a basic image is large as illustrated in FIG. 12, a sweep-out region 161 may enter the zeroth-order region 160.

FIG. 13 is an example of performing translation processing on a basic figure in such a way that the sweep-out region 161 does not enter the opening 171, by using the technique according to the present example embodiment. The present example embodiment performs translation processing by selecting a basic image in which the sweep-out region 161 does not enter the opening 171 even when a basic figure is moved to a target position. The present example embodiment prepares a plurality of phase distributions of a plurality of basic images with different arranged positions of basic figures, in order to perform translation processing in such a way that the sweep-out region 161 does not enter the opening 171.

Figure 14:
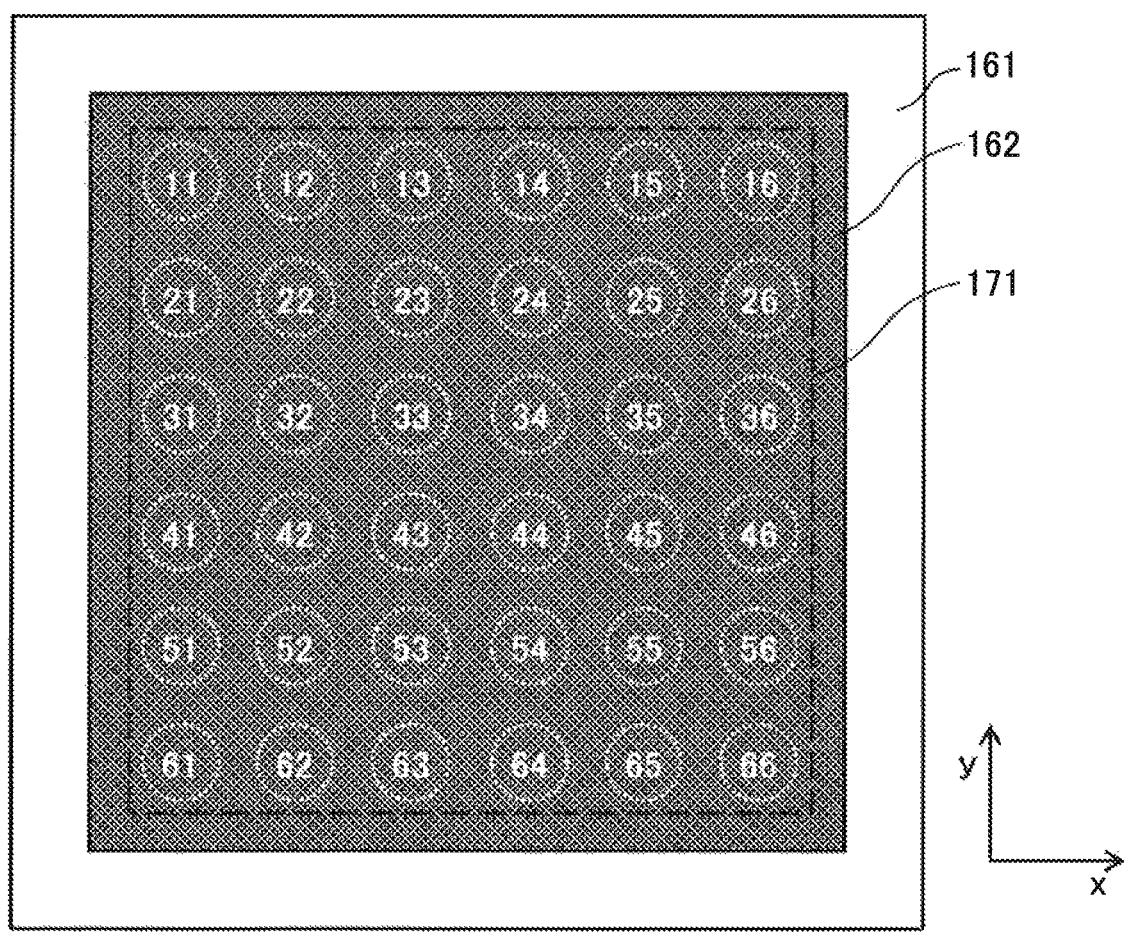
FIG. 14 is a conceptual diagram for illustrating an example of a plurality of arranged positions set in a signal region when sweep-out regions are set on four sides, according to the first example embodiment of the present invention.

FIG. 14 is a conceptual diagram for illustrating setting of a plurality of arranged positions (11 to 66) in the signal region 162 in the opening 171. In FIG. 14, the tens digit of a two-digit number at each arranged position denotes a row number and the units digit denotes a column number.

Furthermore, while a space is provided between each arranged position in FIG. 14, the arranged positions may be closely provided.

FIG. 15 illustrates a basic image table 501 storing a phase distribution of a basic image in which one basic figure (○) is arranged at each arranged position in the signal region 162. Note that, in the basic image table 501 in FIG. 15, a basic image itself is illustrated in place of a phase distribution in order to facilitate understanding of an arranged position of a basic figure.

The present example embodiment stores in the basic image storage unit 21 a phase distribution of a basic images in which a basic figure is arranged at each arranged position in the signal region 162. The conversion processing unit 25 selects a phase distribution of a basic image close to an arranged position of the basic figure after movement and performs conversion processing.

The above is the description of the configuration of the projection device 1 according to the present example embodiment.

(Operation)

Figure 16:
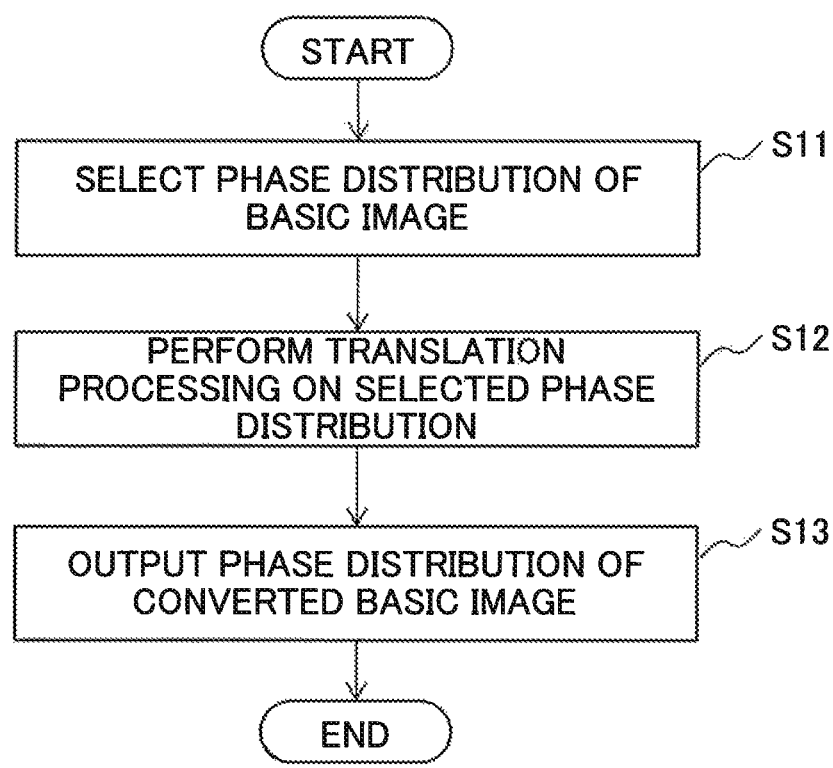
FIG. 16 is a flowchart for illustrating an operation of the conversion processing unit in the projection device according to the first example embodiment of the present invention.

Using a flowchart in FIG. 16, a series of operations when the basic image processing means 20 performs conversion processing on a basic figure will be described here.

First, based on target image information, the image acquisition unit 23 selects a phase distribution of a basic image in which a basic figure is arranged near a desired arranged position from the basic image storage unit 21 (Step S11).

Next, the conversion processing unit 25 performs conversion processing in such a way that the basic figure included in the selected basic image is displayed at the desired arranged position (Step S12).

Then, the output unit 27 outputs the converted phase distribution to the modulation element control means 40 (Step S13).

The above is the description of the series of operations when the basic image processing means 20 performs conversion processing.

For example, it is assumed that a 420×420 pixel signal region is set, and a sweep-out region is set in an area around the signal region. It is further assumed that a margin corresponding to 10 pixels is allowed between the signal region and the sweep-out region. Then, basic figures are closely arranged in a signal region corresponding to 400×400 pixels, and a position of each basic figure is set as an arranged position. At this time, a phase distribution of a basic image in which one basic figure is arranged at each arranged position is prepared for the number of the arranged positions. Then, when a phase distribution of one basic image is selected and translation processing is performed thereon, the basic figure can be displayed at a desired arranged position in such a way that the sweep-out region does not enter the opening on the aperture.

Thus, the present example embodiment previously prepares a plurality of basic figures that can be shifted in such a way that an unnecessary sweep-out region does not enter the opening on the aperture even when a shift based on phase shift calculation is performed. Then, a basic image in which a basic figure is arranged at an arranged position closest to a display position of a basic figure included in a target image displayed on the projection surface is selected. Additionally, the basic image is shifted in such a way that an unnecessary part does not enter the opening on the aperture, and the basic figure is displayed at a desired display position.

Further, when a required number of basic figures arranged along either direction of a vertical and a horizontal directions (first direction) is small, a signal region may be set to fill a screen in a direction orthogonal to the first direction (second direction), and a shift may be performed only in the second direction. Thus, the number of prepared basic figures can be substantially reduced.

As described above, the present example embodiment enables to provide a first effect of improving contrast of an image in a signal region by setting a sweep-out region, and a second effect of preventing the set sweep-out region from entering the opening on the aperture.

The first effect is obtained by preparing phase distributions of basic images including a basic figure for a plurality of arranged positions, optical noise in each of the basic images being reduced by sweeping out the optical noise from the signal region to the sweep-out region.

The second effect is obtained by selecting a phase distribution of a basic image in which a basic figure is arranged near a desired arranged position and performing conversion processing on the selected phase distribution in such a way that the sweep-out region is positioned outside the opening of the aperture.

The present example embodiment previously stores in the projection device a phase distribution of a basic image included in a target image, and therefore iterative Fourier transform processing required when projecting the target image does not need to be performed on the projection device side. Accordingly, processing of generating a phase distribution related to the target image can be speeded up.

The present example embodiment prepares phase distributions of basic images in which a basic figure is arranged at a plurality of arranged positions in the signal region, correspondingly to the plurality of arranged positions. Then, when the basic figure is moved, a phase distribution of a basic image in which the basic figure is arranged at one of the arranged positions is selected, and, with respect to the selected phase distribution of the basic image, the basic figure is moved in the signal region in such a way that the sweep-out region is positioned outside the opening on the aperture. Accordingly, the sweep-out region does not enter the target image.

Second Example Embodiment

Next, a second example embodiment according to the present invention will be described referring to drawings. The present example embodiment stores in a basic image storage unit 21 a phase distribution of a basic image in which sweep-out regions are set above and below a signal region. Note that a control device according to the present example embodiment has the same configuration as the control device 10 according to the first example embodiment, and therefore a drawing thereof is omitted.

Figure 18:
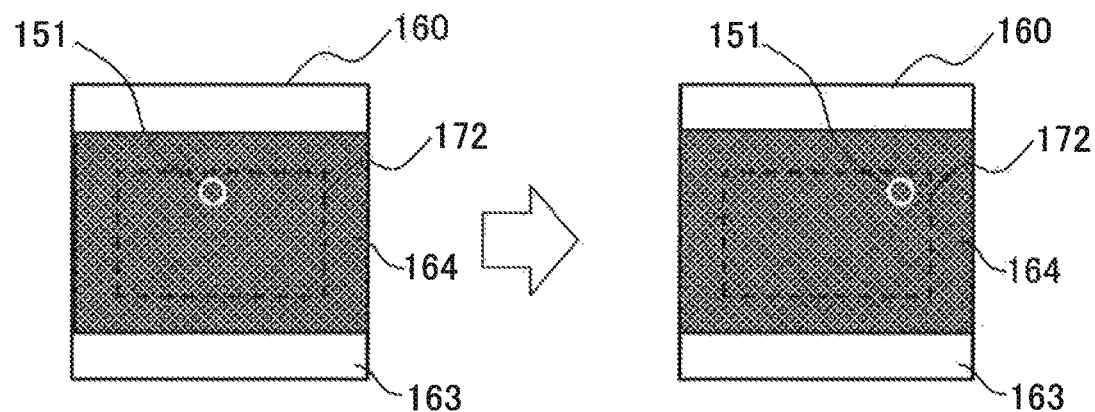
FIG. 18 is a conceptual diagram illustrating an example of performing translation processing on a basic figure in a displayed image set with sweep-out regions on two sides, by the conversion processing unit in the projection device according to the second example embodiment of the present invention.
Figure 19:
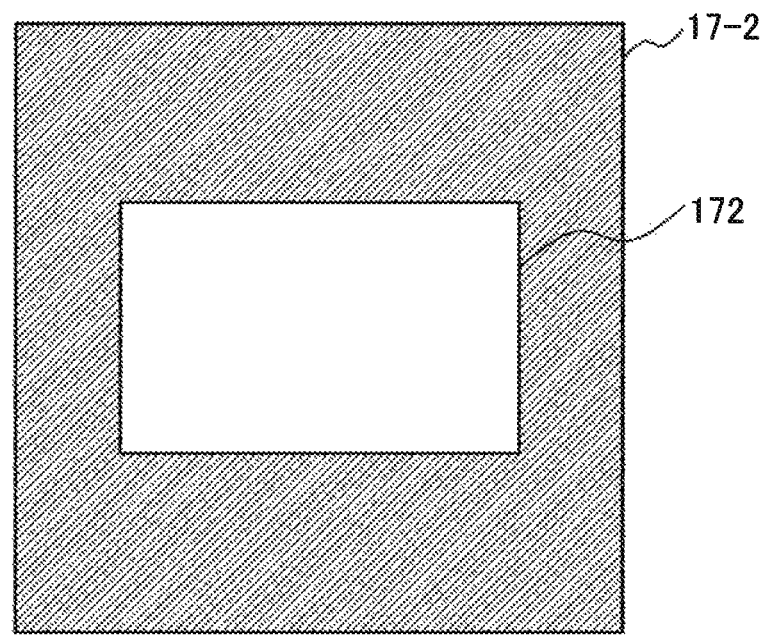
FIG. 19 is a conceptual diagram illustrating an example of an aperture included in the projection device according to the second example embodiment of the present invention.

FIGS. 17 and 18 are examples of performing translation processing on a basic image in which sweep-out regions 163 are set above and below a signal region 164. Furthermore, as illustrated in FIG. 19, the present example embodiment uses an aperture 17-2 on which a rectangular opening 172 is formed. In order to avoid a spot of zeroth order light, the opening 172 on the aperture 17-2 is set with a small signal region being a high-contrast region. Accordingly, the opening 172 on the aperture 17-2 illustrated in FIG. 19 is small compared with the opening 171 on the aperture 17 illustrated in FIG. 3.

When translation processing is performed on a basic image set with sweep-out regions 163 as illustrated in FIG. 17, the entire image including a higher order component undergoes the translation processing on a projection surface. In a case that the sweep-out regions 163 are set above and below the signal region 164, when a basic image is moved in parallel with a longitudinal direction of the sweep-out region 163, the sweep-out region 163 does not enter a zeroth-order region 160 even when an amount of movement by the basic image is large.

Figure 20:
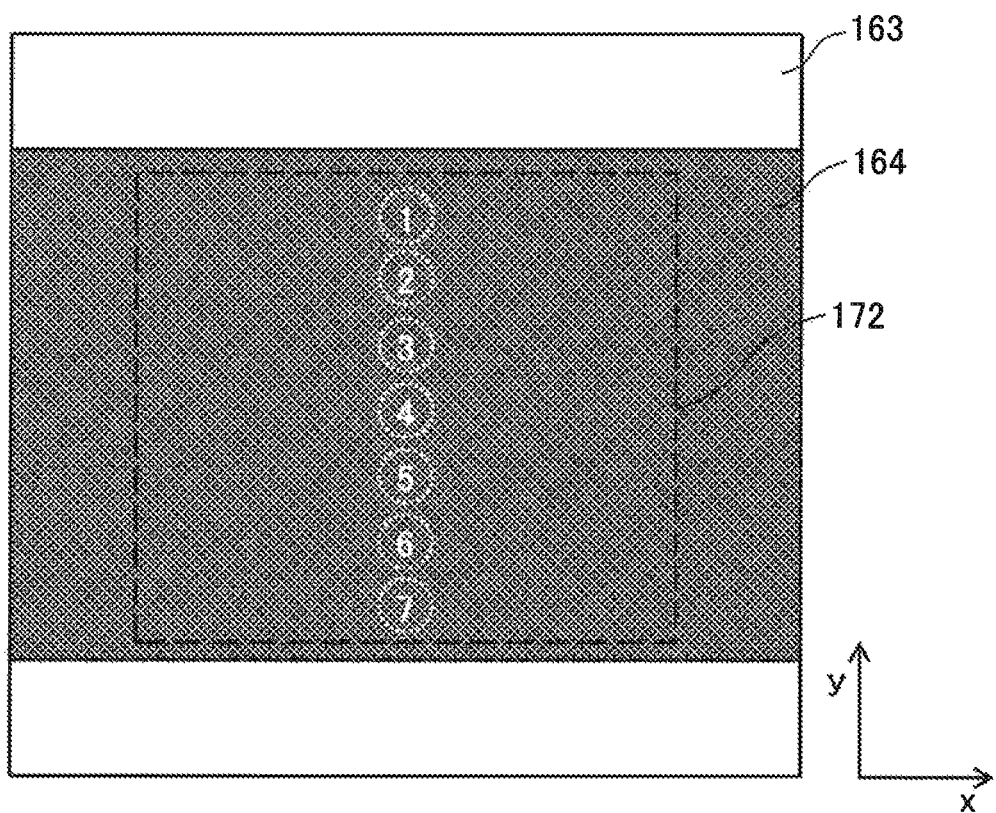
FIG. 20 is a conceptual diagram for illustrating a plurality of arranged positions set in a signal region when sweep-out regions are set on two sides, according to the second example embodiment of the present invention.

FIG. 20 is a conceptual diagram for illustrating setting of a plurality of arranged positions (1 to 7) in the signal region 164 in the opening 172 when the sweep-out regions 163 are set above and below the signal region 164. A single digit number at each arranged position denotes a row number. Furthermore, while no space is provided between each arranged position in FIG. 20, a space may be provided between each arranged position. When a space is provided between each arranged position 164, translation processing may be performed in a direction orthogonal to a longitudinal direction of the sweep-out region 163 in order to prevent the sweep-out region 163 from entering the opening 172.

In the example in FIG. 20, in order to display a basic figure (o), phase distributions of basic images in which a basic figure (o) is displayed at arranged positions 1 to 7 are stored in the basic image storage unit 21. In other words, in the example in FIG. 20, seven phase distributions of basic images, a basic figure (o) being arranged at each arranged position in each of the basic images, may be prepared. Thus, the present example embodiment is able to reduce a number of basic images prepared in the basic image recording means 21.

FIG. 21 illustrates a basic image table 502 storing a phase distribution of a basic image in which a basic figure (o) is arranged at each arranged position in the signal region 164. Note that, in the basic image table 502 in FIG. 21, a basic image itself is illustrated in place of a phase distribution. A usage direction of FIG. 21 is similar to that of the basic image table 501 in FIG. 15, and therefore description thereof is omitted.

In a case that the sweep-out regions 161 are set on four sides as is the case with the first example embodiment, when a movement distance in translation processing is increased, optical noise swept out to the sweep-out region 161 enters the opening 171. Accordingly, the first example embodiment needs to sufficiently decrease a movement distance in translation processing by setting arranged positions in a grid-like manner in the signal region 162 in order to prevent the sweep-out region 161 from entering the opening 171 by the translation processing.

In a case that the sweep-out regions 163 are set in upper and lower positions as is the case with the present example embodiment, optical noise is not swept out in a horizontal direction in the signal region 164 even when a movement distance in translation processing is long, and therefore optical noise swept out to the sweep-out region 163 does not enter the opening 172. Accordingly, there is no need to set arranged positions in a grid-like manner in the signal region 164 in order to prevent the sweep-out region 163 from entering the opening 172 by the translation processing, and therefore a movement distance in the translation processing can be increased.

Further, when the sweep-out regions 163 are set above and below the signal region 164 as is the case with the present example embodiment, a number of phase distributions stored in the basic image storage unit 21 can be decreased, compared with the case of the first example embodiment that the sweep-out regions 161 are set in an area around the signal region 162.

As described above, by using a basic image provided with a sweep-out region sweeping out optical noise, the present example embodiment also enables to reduce optical noise superposed on a target image and improve contrast of the target image. Further, the present example embodiment enables to improve efficiency in a storage capacity and arithmetic processing by optimizing a position of the sweep-out region, and enables to more brightly display a high-contrast target image by enlarging the sweep-out region.

Modified Example

An example of preparing a basic image in which a basic figure is arranged at an arranged position illustrated in FIG. 20, according to the second example embodiment, has been described. In the example in FIG. 20, phase shift calculation needs to be performed in a y-direction also although an amount of movement is small.

When there is a margin in a capacity for storing basic images, for example, basic images, a basic figure being arranged at a position shifted by one pixel in the y-direction in each of the basic images, may be prepared. For example, when a display part of a spatial modulation element 13 has 400×400 pixels, 400 basic images, a basic figure being arranged at a position shifted by one pixel in the y-direction in each of the basic images, may be prepared. In this case, phase shift calculation in the y-direction can be omitted and phase shift calculation in an x-direction has only to be performed, and therefore an operation speed can be increased. Further, the present modified example is also able to reduce a phase shift calculation resource in the y-direction.

Third Example Embodiment

Next, a third example embodiment according to the present invention will be described referring to drawings. A projection device according to the present example embodiment includes an aperture 17-3 on which a circular opening 173 is formed in place of the aperture 17 on which the rectangle opening 171 is formed. The projection device according to the present example embodiment has the same configuration as the control device 10 according to the first example embodiment except for the aperture 17-3.

Figure 22:
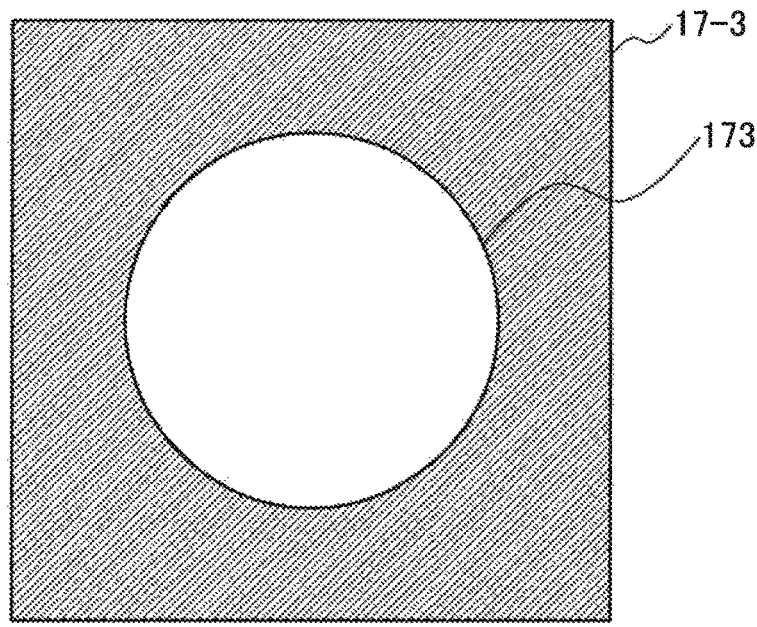
FIG. 22 is a conceptual diagram illustrating an example of an aperture in a projection device according to a third example embodiment of the present invention.

FIG. 22 illustrates the aperture 17-3 included in the control device according to the present example embodiment. The circular opening 173 is formed on the aperture 17-3.

Figure 23:
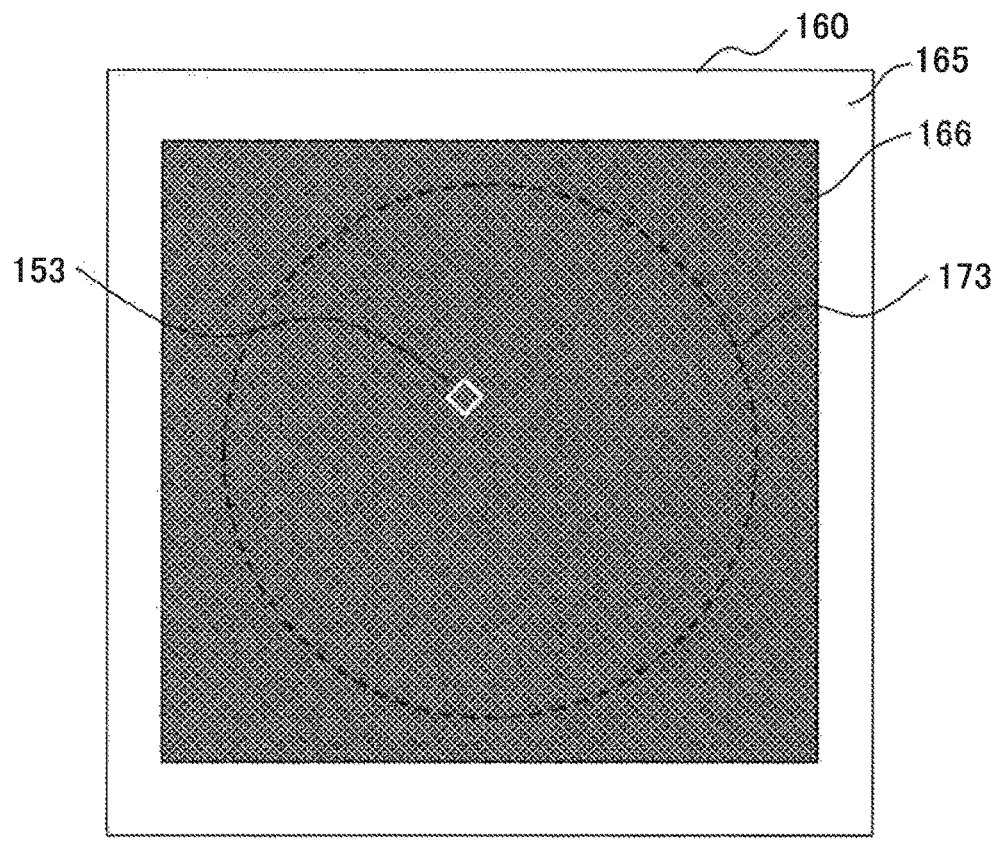
FIG. 23 is a conceptual diagram illustrating an example of a basic figure projected by the projection device according to the third example embodiment of the present invention.

FIG. 23 is a diagram extracting the inside of a zeroth-order region 160. Note that the example in FIG. 23 is an example of rotating a square basic figure (□) by 45 degrees and projecting the basic figure.

As modulated light 130 reflected by a display part on a spatial modulation element 13 passes the opening 173 through a Fourier transform lens 16, a higher order component of the modulated light 130 is shielded by the aperture 17-3, and then a basic image (◇) illustrated in the opening 173 in FIG. 23 is displayed on a projection surface.

Figure 24:
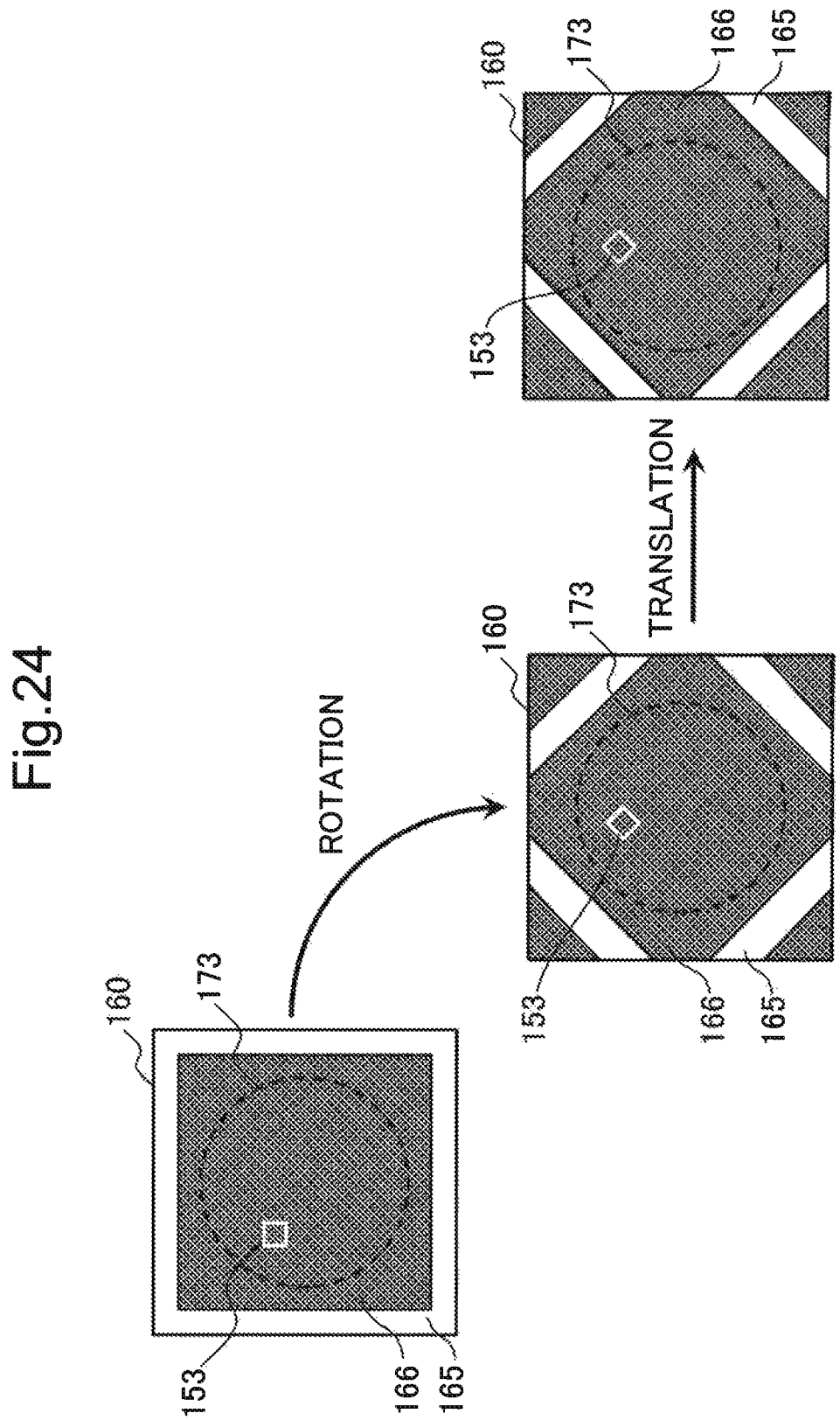
FIG. 24 is a conceptual diagram illustrating an example of performing translation processing and rotation processing on a basic figure in a displayed image set with sweep-out regions on four sides, by a conversion processing unit in the projection device according to the third example embodiment of the present invention.

FIG. 24 is an example of rotating a square basic figure (□) by 45 degrees and further performing translation processing thereon. Note that, in the example in FIG. 24, with regard to a basic image in which sweep-out regions are set on four sides, a basic image storage unit 21 is caused to store a plurality of the basic images, a square basic figure being arranged in each of the basic images, as illustrated in the basic image table 501 in FIG. 15.

For example, an image acquisition unit 23 selects a basic image including a basic figure (□) that moves near a desired arranged position upon rotation by 45 degrees. A conversion processing unit 25 rotates the selected basic image (□) by 45 degrees and performs translation processing in such a way that the rotated basic figure (◇) is arranged at the desired arranged position. An output unit 27 outputs the basic image having undergone the conversion processing as a target image.

Figure 25:
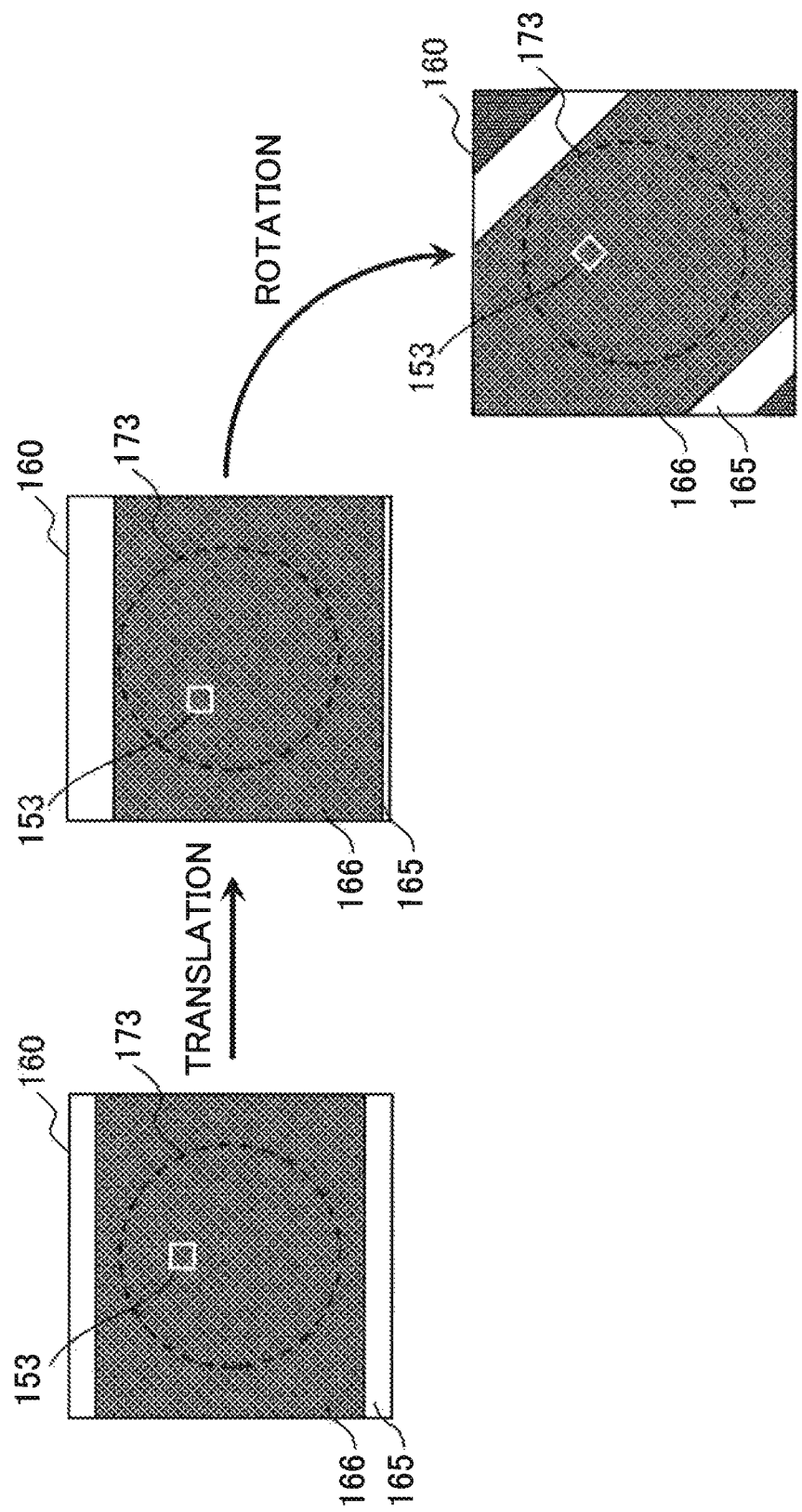
FIG. 25 is a conceptual diagram illustrating an example of performing translation processing and rotation processing on a basic figure in a displayed image set with sweep-out regions on two sides, by the conversion processing unit in the projection device according to the third example embodiment of the present invention.

FIG. 25 is an example of performing translation processing on a square basic figure (□) and further rotating the basic figure by 45 degrees, with regard to a basic image in which the sweep-out regions are set on two sides facing one another. With regard to the basic image in which the sweep-out regions are set on two sides facing one another, rotation processing can be performed on a basic figure similarly to the case of the sweep-out regions being set on four sides.

As described above, the present example embodiment enables to perform rotation processing on a basic figure by using an aperture on which a circular opening is formed.

Modified Example

Figure 26:
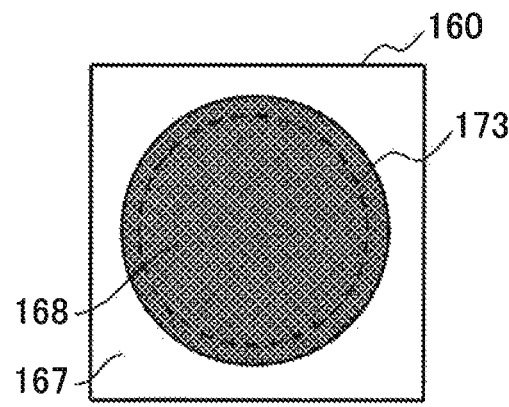
FIG. 26 is a conceptual diagram of an example of a signal region set in a modified example according to the third example embodiment of the present invention.

FIG. 26 is a conceptual diagram for illustrating a sweep-out region 167 set in a modified example of the third example embodiment. The present modified example sets a circular signal region 168 and sets the sweep-out region 167 around the signal region 168. Furthermore, the present modified example sets the circular signal region 168 in such a way to include an outer periphery of an opening 173 and sets the sweep-out region 167 around the signal region 168.

Figure 27:
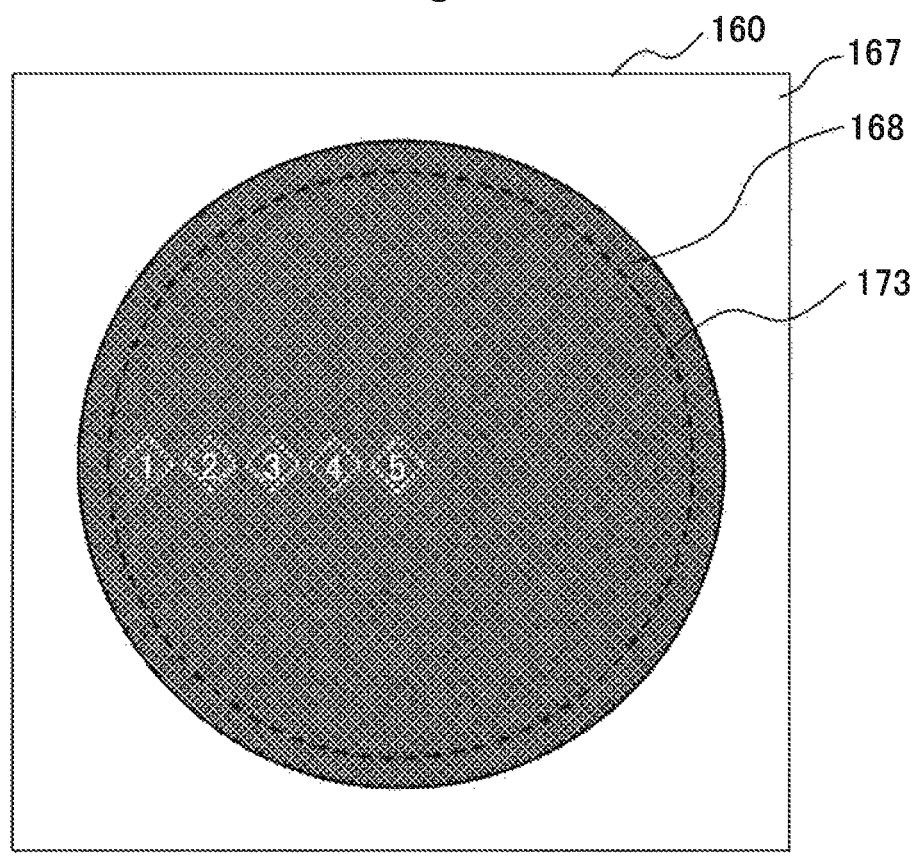
FIG. 27 is a conceptual diagram for illustrating a plurality of arranged positions set in the signal region in the modified example according to the third example embodiment of the present invention.

The sweep-out region 167 according to the present modified example can be set larger than the sweep-out region 165 in FIG. 23, and therefore contrast in the signal region can be further improved. Further, the present modified example may set arranged positions of basic figures in a line along a radius of the signal region 168 as illustrated in FIG. 27. The arrangement as illustrated in FIG. 27 enables to decrease a number of basic images to be prepared, and therefore enables to reduce a storage capacity.

Fourth Example Embodiment

Next, an interface apparatus 101 according to a fourth example embodiment of the present invention will be described.

Figure 28:
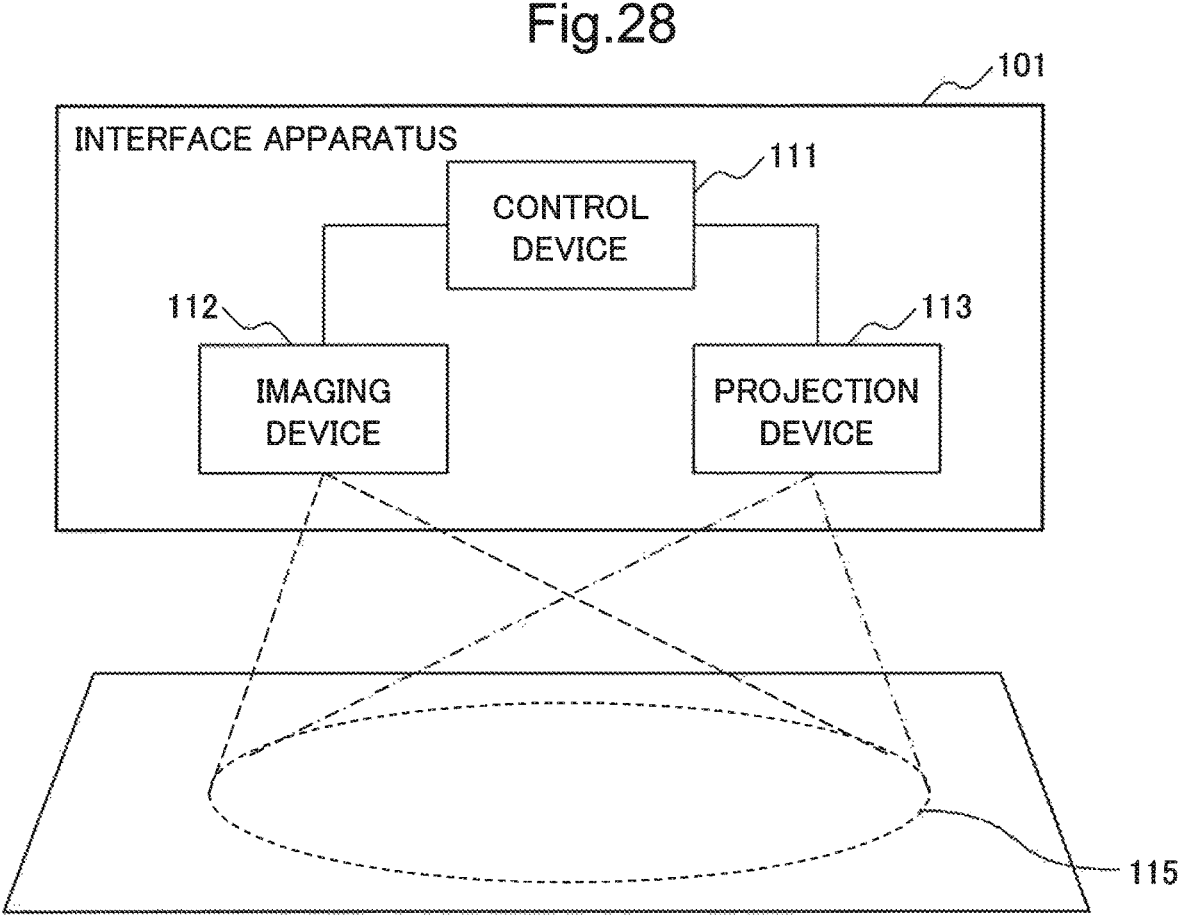
FIG. 28 is a conceptual diagram illustrating a configuration of an interface apparatus according to a fourth example embodiment of the present invention.

As illustrated in FIG. 28, the interface apparatus 101 according to the present example embodiment includes a control device 111, an imaging device 112, and a projection device 113. The projection device 113 in the interface apparatus 101 according to the present example embodiment includes the functions provided by the projection device according to any one of the first to third example embodiments. Further, the control device 111 may be caused to include at least part of the functions provided by the control means according to the first to third example embodiments.

The control device 111 controls the entire interface apparatus 101. The control device 111 acquires an image captured by the imaging device 112 and recognizes a position and an operation of an indicator such as a finger or a hand of a manipulator as a manipulation, the indicator being included in the acquired image. The control device 111 provides a suitable image signal based on the recognition result for the projection device 113 and causes the projection device 113 to project a target image. Further, the control device 111 causes the imaging device 112 to capture a manipulation region 115, clarifies coordinates indicating a positional relation between a projected image and a captured image, and performs control in such a way that each image is aligned with one another. For example, the control device 111 may be provided by a function of a microcomputer including an arithmetic device and a control device.

In other words, the control device 111 provides the projection device 113 with image information related to a manipulation performed on a user interface displayed in the manipulation region 115 captured by the imaging device 112 and controls the projection device 113 to project an image based on the image information.

Further, when recognizing a manipulation performed on a user interface displayed in the manipulation region 115, the control device 111 according to the present example embodiment transmits the recognition result to an upper system such as a server.

The imaging device 112 captures a region including the manipulation region 115 for displaying a user interface. For example, the imaging device 112 may be provided by a function of a common camera. For example, the imaging device 112 may have a function of capturing light at a wavelength other than visible light, such as infrared light or ultraviolet light. Further, for example, a function such as a depth sensor or a time-of-flight (TOF) camera may be included in the imaging device 112.

The projection device 113 includes the function of the projection device including the control means according to the first to third example embodiments. The projection device 113 projects an image including a user interface on the manipulation region 115 accepting a user manipulation, in accordance with control by the control device 111.

An interface apparatus can be configured by combining the projection device according to the respective example embodiments with a camera, as is the case with the present example embodiment. The interface apparatus according to the present example embodiment captures, by a camera, a manipulation performed on a user interface included in a projected image, recognizes the manipulation, and performs interactive input-output. In such an interface apparatus, a basic figure included in a projected image is frequently determined depending on a purpose, and therefore it is possible to previously prepare a basic image including the basic figure.

For example, when the interface apparatus is used for pointing purposes, all it takes is pointing a basic figure indicating a direction such as an arrow at a plurality of targets. Further, a basic image including a basic figure such as a piping diagram or a map may be previously prepared. However, states such as a projection position, an angle, and a number of a basic figure to be projected change moment by moment depending on a user manipulation, and therefore a projection condition needs to be changed at any time.

Considering signal-to-noise (SN), it is desirable to repeat an iteration operation such as an iterative Fourier transform around 100 to 1000 times in order to obtain a clear target image. However, it is difficult to perform an iteration operation for calculating a phase distribution of a target image in real time with performance of a current personal computer (PC). Furthermore, it is almost impossible to perform the iteration operation by a central processing unit (CPU) equipped on a wearable device.

The present example embodiment enables to reduce an amount of calculation expended for an iterative Fourier transform performed upon generation of a phase distribution of a projected target image, and therefore enables to overcome the problem as described above.

Fifth Example Embodiment

Next, a fifth example embodiment according to the present invention will be described referring to drawings. A projection system 100 connecting the projection device 1 according to the first to third example embodiments to a server 102 through a network 103, according to the present example embodiment, will be described. Furthermore, the projection system 100 may be configured to connect the interface apparatus 101 according to the fourth example embodiment to the server 102 through the network 103.

Figure 29:
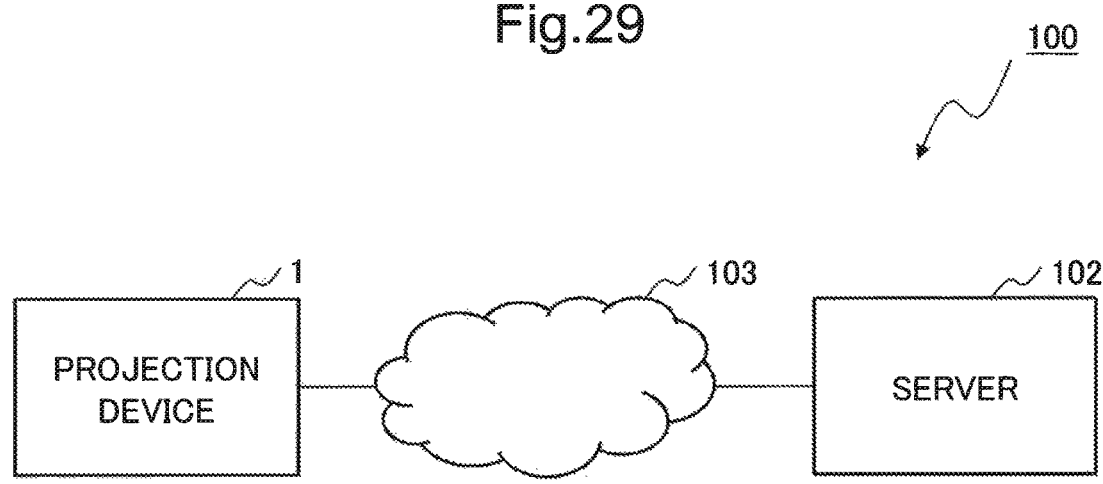
FIG. 29 is a conceptual diagram illustrating a configuration of a projection system according to a fifth example embodiment of the present invention.

FIG. 29 is a conceptual diagram illustrating a configuration of the projection system 100 according to the present example embodiment. The projection system according to the present example embodiment includes the projection device 1 and the server 102. The projection device 1 and the server 102 are connected through the network 103. Furthermore, the network 103 includes common communication lines such as the Internet and an intranet.

The server 102 transmits a phase distribution of a basic image in which a basic figure is arranged and target image information (target image) to the projection device 1.

Figure 30:
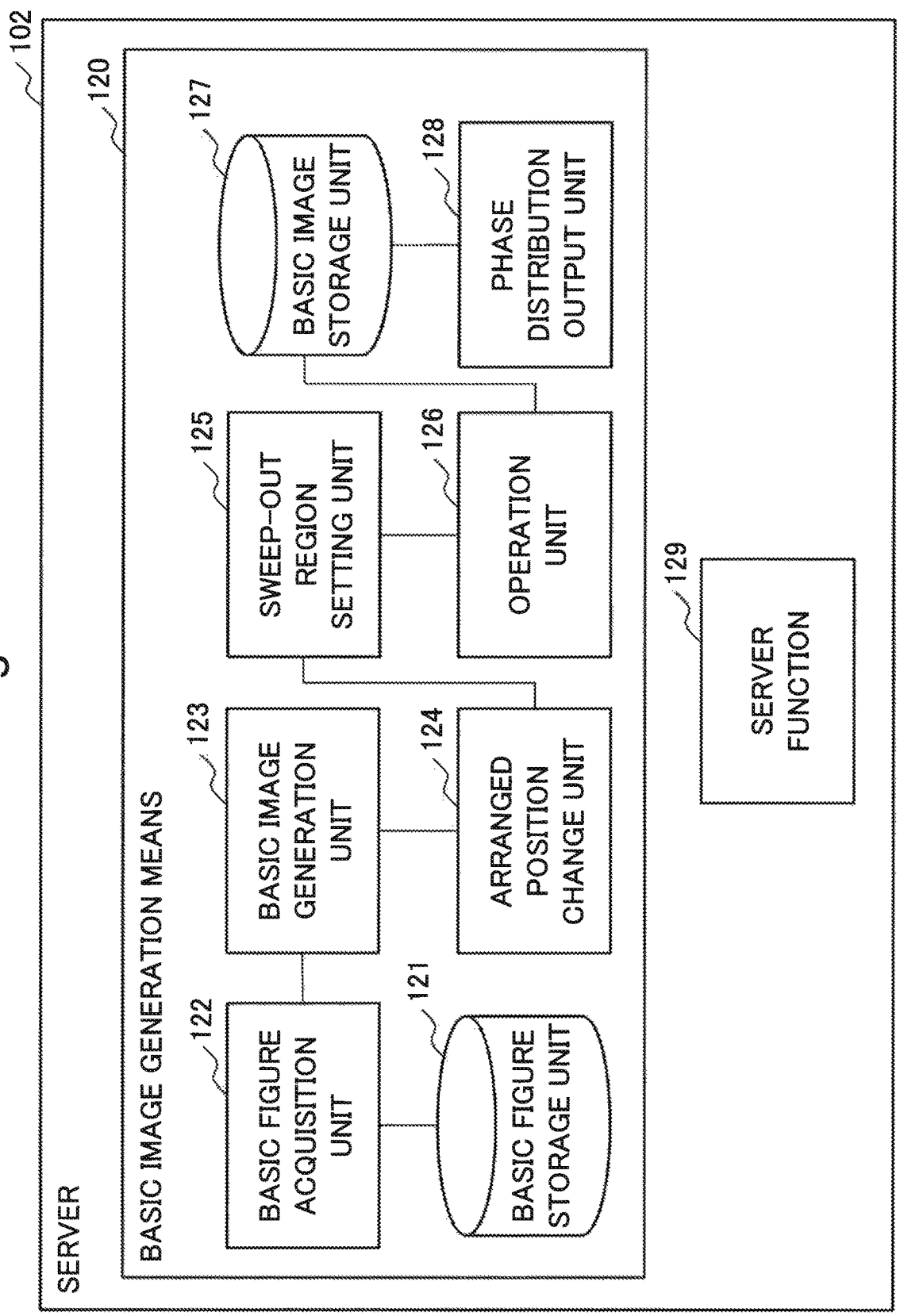
FIG. 30 is a conceptual diagram illustrating a configuration of a basic image generation means included in a server in the projection system according to the fifth example embodiment of the present invention.

FIG. 30 is a block diagram illustrating a configuration of the server 102 in the projection system 100 according to the present example embodiment. The server 102 includes a basic image generation means 120 generating a basic image and a phase distribution thereof, in addition to a server function 129 provided by a common server. Furthermore, the server function 129 functions as a communication interface for the basic image generation means 120 to transmit and receive data to and from the projection device 1 and the like.

(Basic Image Generation Means)

Next, a configuration of the basic image generation means 120 will be described.

The basic image generation means 120 includes a basic figure storage unit 121, a basic figure acquisition unit 122, a basic image generation unit 123, an arranged position change unit 124, a sweep-out region setting unit 125, an operation unit 126, a basic image storage unit 127, and a phase distribution output unit 128.

The basic figure storage unit 121 stores various basic figures. For example, the basic figure storage unit 121 stores basic figures such as a circle (○) and a rectangle (□). Furthermore, basic figures stored by the basic figure storage unit 121 can be freely set.

The basic figure acquisition unit 122 acquires a basic figure to be transmitted to the projection device 1 from the basic figure storage unit 121. For example, the basic figure acquisition unit 122 acquires a basic figure specified by a manipulation by a manipulator or specified by an upper system.

The basic image generation unit 123 generates a basic image including each basic figure. For example, the basic image generation unit 123 generates a basic figure having a size, a line thickness, and the like optimized for display on a projection surface. Furthermore, a basic image generated by the basic image generation unit 123 corresponds to an electric field amplitude distribution of a target image.

The arranged position change unit 124 generates a plurality of basic images, a basic figure included in a basic image generated by the basic image generation unit 123 being arranged at a plurality of arranged positions in each of the basic images. The arranged position change unit 124 generates a plurality of basic images, at least one basic figure being arranged at a plurality of arranged positions in each of the basic images. Furthermore, the basic image generation unit 123 may include the function of the arranged position change unit 124.

The sweep-out region setting unit 125 sets a sweep-out region to a basic image generated by the arranged position change unit 124.

The operation unit 126 performs iterative Fourier transform processing by using a basic image with a sweep-out region set by the sweep-out region setting unit 125 and generates a phase distribution of the basic image including a basic figure. Note that details of the iterative Fourier transform processing will be described later.

Further, the operation unit 126 sets an initial value of a phase distribution used when performing iterative Fourier transform processing. The initial value of the phase distribution is a predetermined phase distribution and may be any pattern. For example, any pattern such as a random pattern, a second-order lenticular pattern, or a linear pattern may be set as the phase distribution of the initial value.

The basic image storage unit 127 stores a phase distribution of a basic image generated by the operation unit 126. For example, the basic image storage unit 127 may store the phase distribution of a basic image in the form of the basic image table illustrated in FIGS. 15 and 21.

The phase distribution output unit 128 acquires a phase distribution of a basic image generated by the operation unit 126 from the basic image storage unit 127, associates the acquired phase distribution with the related basic image, and outputs the resulting phase distribution to the server function 129. For example, the phase distribution output unit 128 may output the phase distribution stored in the form of the basic image table illustrated in FIGS. 15 and 21.

A phase distribution output from the phase distribution output unit 128 is transmitted to the projection device 1 from the server function 129.

Iterative Fourier Transform Processing

The iterative Fourier transform processing performed by the operation unit 126 will be described here. Note that a case that a signal region and a sweep-out region are set to a basic image will be described below.

Figure 31:
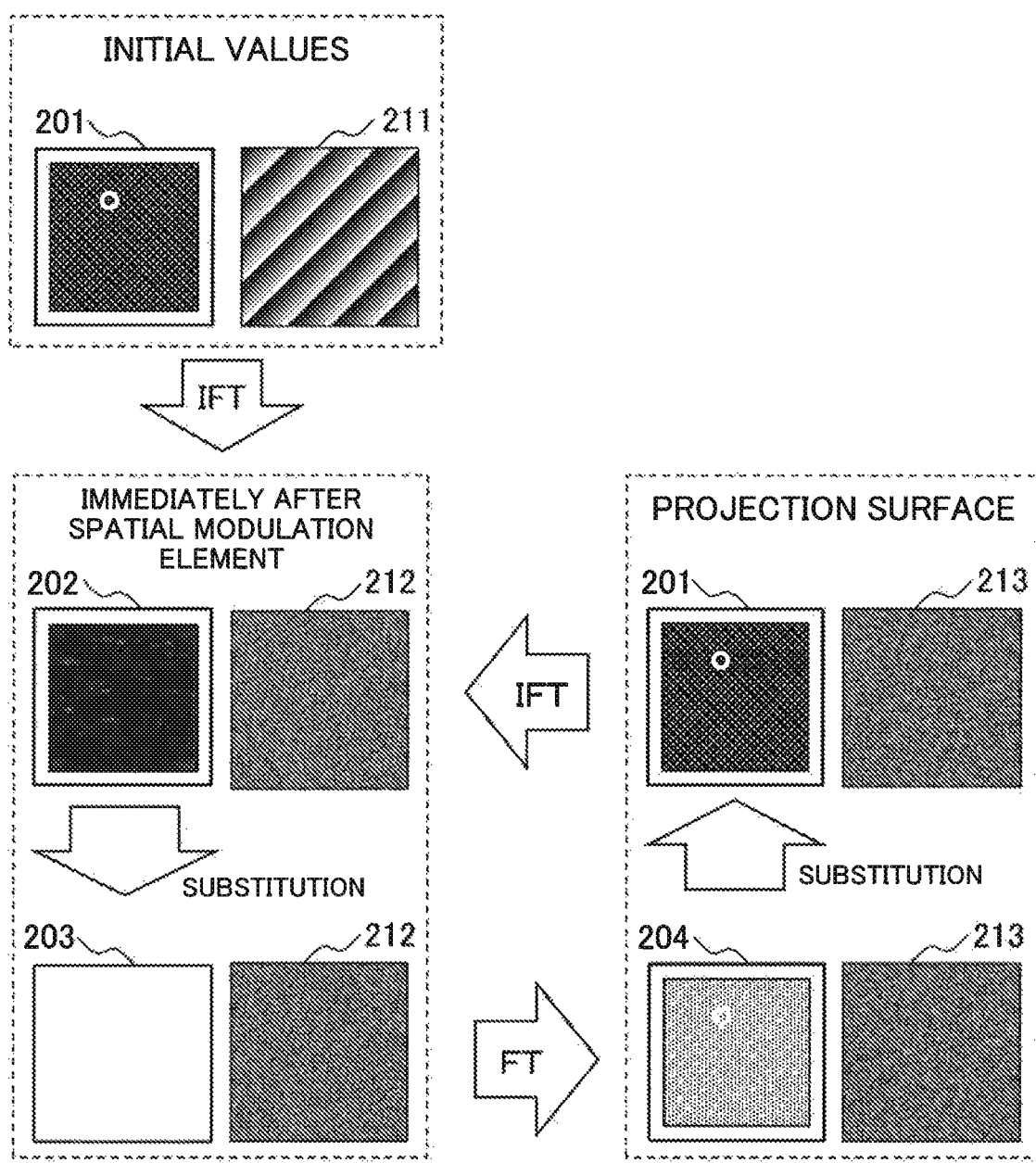
FIG. 31 is a conceptual diagram illustrating an example of iterative Fourier operation processing performed by an operation unit in the projection system according to the fifth example embodiment of the present invention.

FIG. 31 is a conceptual diagram for illustrating the iterative Fourier transform processing. Note that each phase distribution illustrated in FIG. 31 is a dummy pattern, and even when the dummy patterns are displayed on a display part of a spatial modulation element 13 and light is irradiated on the display part, a target image may not necessarily be obtained. Further, in FIG. 31, FT denotes a Fourier transform, and IFT denotes an inverse Fourier transform.

A photoelectric field distribution E on the projection surface is obtained by performing a Fourier transform on a photoelectric field distribution immediately after the spatial modulation element. A square of the photoelectric field distribution E on the projection surface being $|E|^2$ corresponds to a light intensity distribution of a target image. Conversely, a photoelectric field distribution immediately after the spatial modulation element is obtained by performing an inverse Fourier transform on a photoelectric field distribution E on the projection surface. In an iterative Fourier transform, optimization is performed by repeating an inverse Fourier transform and a Fourier transform until a phase distribution of the target image is obtained.

Inside the signal region, after the Fourier transform is performed, an amplitude distribution obtained up to that stage is substituted by an amplitude distribution of the target image (basic image). On the other hand, inside the sweep-out region, after the Fourier transform is performed, the amplitude distribution obtained up to that stage is not substituted. Consequently, a light intensity converges to the target pattern in the signal region, whereas optical noise is swept out to the sweep-out region. When the target image is displayed on the projection surface by using the phase distribution obtained as a result, an image in which optical noise is swept out to the sweep-out region is obtained.

When the sweep-out region is enlarged and the signal region is reduced, optical noise swept out to the sweep-out region increases due to an increased spatial degree of freedom, and therefore quality of an obtained target image improves but the image in the signal region becomes darker. By contrast, when the sweep-out region is reduced and the signal region is enlarged, optical noise swept out to the sweep-out region decreases due to a decreased spatial degree of freedom, and therefore quality of an obtained target image is reduced while the image in the signal region becomes brighter.

In other words, when the sweep-out region is enlarged, light swept out to the sweep-out region as optical noise increases, whereas a projected target image becomes darker due to decrease in light converged for forming the target image in the signal region. Accordingly, it is preferable that the sweep-out region be set in such a way to balance brightness of a projected target image and a removed amount of optical noise.

Using a flowchart in FIG. 32, a flow of the iterative Fourier transform processing will be described here.

Figure 32:
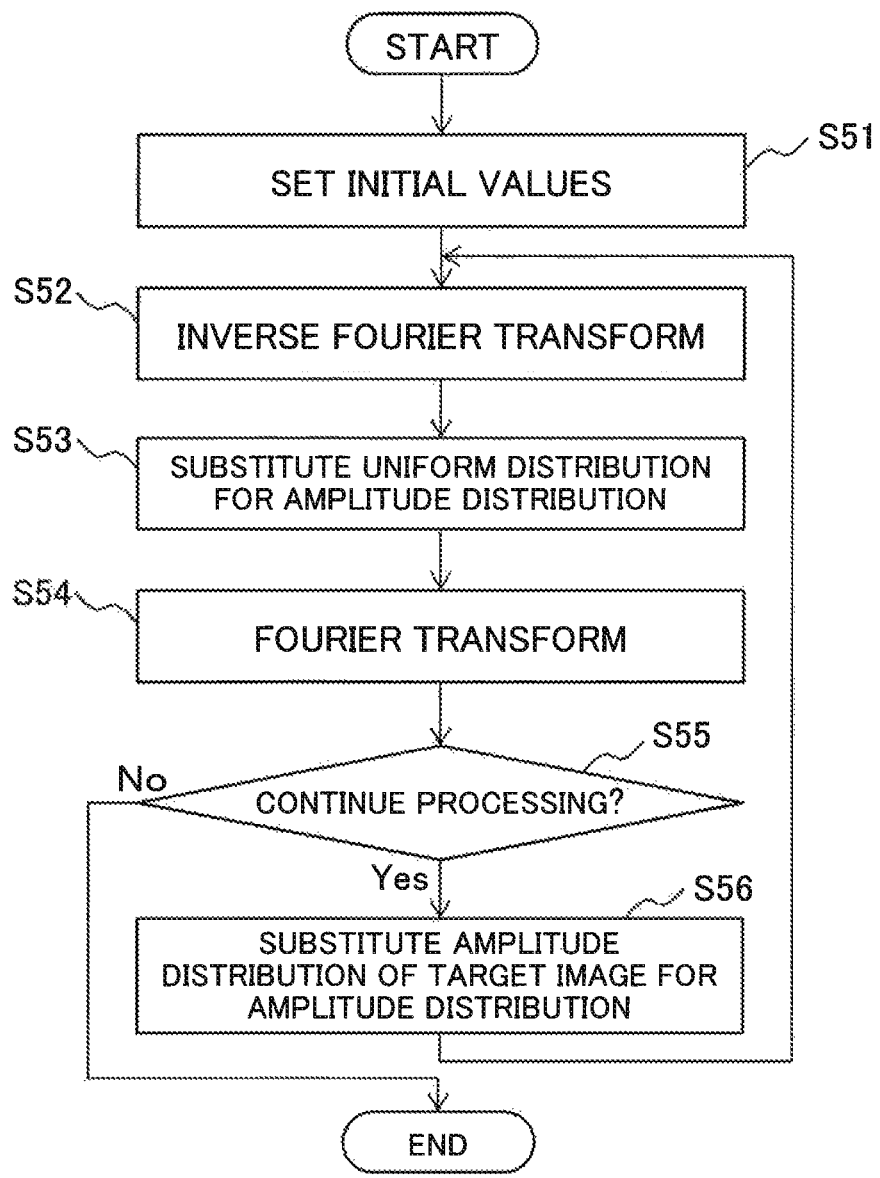
FIG. 32 is a flowchart illustrating a flow of the iterative Fourier operation processing performed by the operation unit in the projection system according to the fifth example embodiment of the present invention.

First, in FIG. 32, an amplitude distribution 201 ($F_0$) of a target image and a suitable phase distribution 211 ($\Delta\Phi_0$) are given as initial values (Step S51).

The phase distribution 211 ($\Delta\Phi_0$) given here is a predetermined phase distribution and may have any pattern. For example, the phase distribution 211 ($\Delta\Phi_0$) may have any pattern such as a random pattern, a second-order lenticular pattern, or a linear pattern.

Next, an amplitude distribution 202 ($f_1$) and a phase distribution 212 ($\Delta\varphi_1$) are generated by performing an inverse Fourier transform operation (first inverse Fourier transform) using the amplitude distribution 201 ($F_0$) and the phase distribution 211 ($\Delta\Phi_0$) (Step S52).

Specifically, in the first inverse Fourier transform, a photoelectric field distribution obtained by combining the amplitude distribution of the target image with the predetermined phase distribution is inverse Fourier transformed, and a photoelectric field distribution immediately after the spatial modulation element is generated. Note that the phase distribution 211 ($\Delta\Phi_0$) given as an initial value has a pattern irrelevant to the amplitude distribution 201 ($F_0$), and therefore the amplitude distribution 202 ($f_1$) generated here becomes a meaningless pattern.

Next, the amplitude distribution 202 ($f_1$) is replaced by a suitable pattern. Assuming that uniform laser light is incident on the display part of the spatial modulation element 13 in the example in FIG. 31, the amplitude distribution 202 ($f_1$) is substituted by a uniform amplitude distribution 203 (f0) (Step S53).

Next, an amplitude distribution 204 ($F_1$) and a phase distribution 213 ($\Delta\Phi_1$) are generated by performing a Fourier transform operation (first Fourier transform) on the uniform amplitude distribution 203 ($f_0$) and the phase distribution 212 ($\Delta\varphi_1$) (Step S54).

Specifically, in the first Fourier transform, a photoelectric field distribution obtained by combining the phase distribution generated by the first inverse Fourier transform with the uniform amplitude distribution is Fourier transformed, and a photoelectric field distribution of the target image on the projection surface is generated. The amplitude distribution 204 ($F_1$) generated first is an image with a somewhat enhanced edge of the amplitude distribution 201 ($F_0$) of the target image. At this stage, an amplitude distribution of a desired target image is not yet obtained.

When the processing is to be continued (Yes in Step S55), the amplitude distribution 204 ($F_1$) is substituted by the amplitude distribution 201 ($F_0$) of the target image (Step S56). The processing returns to Step S52 after Step S56.

On the other hand, when the processing is to be ended (No in Step S55), the processing following the flowchart in FIG. 32 is ended. A phase distribution $\Delta\varphi$ obtained at this stage is a phase distribution of the target image. For example, a condition (hereinafter referred to as a predetermined condition) to be reached by a light intensity distribution $|E|^2$ on the projection surface for the iterative Fourier transform to be continued may be determined, and the spatial modulation element 13 may be set to be controlled by using a phase distribution $\Delta\varphi$ at a stage when the predetermined condition is met.

When the processing is to be continued (Yes in Step S55), the processing returns to Step S52 and performs an inverse Fourier transform operation (second inverse Fourier transform) by using the amplitude distribution 201 ($F_0$) and the phase distribution 213 ($\Delta\Phi_1$) (Step S52).

Specifically, in the second inverse Fourier transform, a photoelectric field distribution obtained by combining the phase distribution generated by the first Fourier transform with the amplitude distribution of the target image is inverse Fourier transformed, and a photoelectric field distribution immediately after the spatial modulation element is generated. By using a phase distribution ($\Delta\Phi_2$) obtained at this stage, a light intensity distribution closer to the target image than when using the phase distribution 212 ($\Delta\varphi_1$) is obtained.

Furthermore, an amplitude distribution ($f_2$) is substituted by a uniform amplitude distribution 203 ($f_0$) (Step S53). An amplitude distribution ($F_3$) and a phase distribution ($\Delta\Phi_3$) are generated by performing a Fourier transform operation (second Fourier transform) by using the uniform amplitude distribution 203 ($f_0$) and a phase distribution ($\Delta\varphi_2$) (Step S54).

Specifically, in the second Fourier transform, a photoelectric field distribution obtained by combining the phase distribution generated by the second inverse Fourier transform with the uniform amplitude distribution is Fourier transformed, and a photoelectric field distribution on the projection surface is generated. Note that the first and second Fourier transforms actually perform similar Fourier transform processing.

When the iterative Fourier transform processing is to be continued (Yes in Step S55), an amplitude distribution ($F_4$) is substituted by the amplitude distribution 201 ($F_0$) of the target image (Step S56), and the processing returns to Step S52.

The inverse Fourier transform operation (second inverse Fourier transform) and the Fourier transform operation (second Fourier transform processing) are hereinafter repeated (Steps S52 to S56), and a phase distribution $\Delta\varphi$ forming a light intensity distribution yet closer to the target image on the projection surface is calculated.

Note that, the iterative Fourier transform processing becomes saturated when repeated a certain number of times, and therefore a light intensity distribution completely matching the target image cannot be obtained. Accordingly, the control means 10 performs optimization until a target phase distribution is obtained while repeating the inverse Fourier transform and the iterative Fourier transform. For example, a criterial state of an amplitude distribution generated by a Fourier transform for ending the iteration and a criterial count of iterative Fourier transforms may be set. Further, for example, a Fourier error and an object error may be set as error functions for evaluating a degree of convergence in each iteration, and a determination on whether to end the iteration may be made by a decision criterion using the error functions.

As described above, the iterative Fourier transform processing optimizes a phase distribution until a desired target image is obtained, by setting initial values and repeatedly performing an inverse Fourier transform and a Fourier transform. Note that the description of the aforementioned iterative Fourier transform processing is an example and does not limit a processing algorithm being actually used to the aforementioned technique, and various types of processing may be added or deleted.

The present example embodiment enables to generate a phase distribution of a basic image set with a sweep-out region on the server side. Furthermore, when there is a margin in a space on the projection device side, the basic image generation means configured in the server may be configured to be included in the projection device.

(Hardware Configuration)

Figure 33:
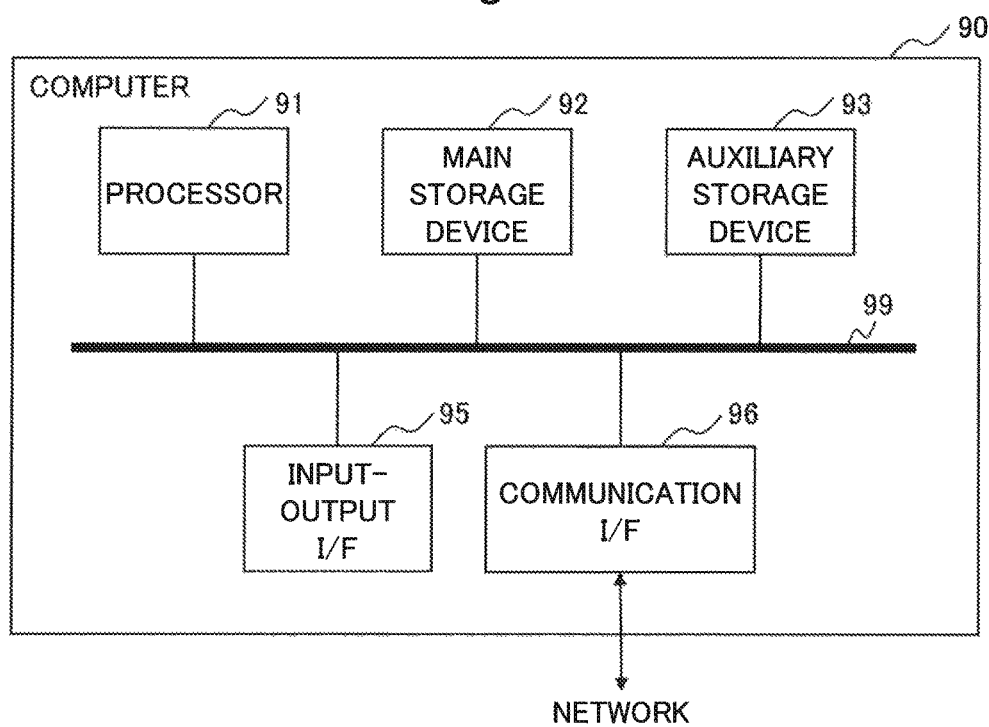
FIG. 33 is an example of a hardware configuration of the control means according to the respective example embodiments of the present invention.

Next, a hardware configuration for enabling the control means in the projection devices according to the respective example embodiments will be described, taking a computer 90 in FIG. 33 as an example. Note that the computer 90 in FIG. 33 is a configuration example for enabling the projection devices according to the respective example embodiments and does limit the scope of the present invention. Further, when the control means according to the respective example embodiments is included in the interface apparatus 101 as illustrated in FIG. 28, it is preferable that the control means be a microcomputer having the function of the computer 90 illustrated in FIG. 33.

As illustrated in FIG. 33, the computer 90 includes a processor 91, a main storage device 92, an auxiliary storage device 93, an input-output interface 95, and a communication interface 96. The processor 91, the main storage device 92, the auxiliary storage device 93, the input-output interface 95, and the communication interface 96 are connected in a mutually data exchangeable manner through a bus 99. Further, the processor 91, the main storage device 92, the auxiliary storage device 93, and the input-output interface 95 are connected to a network such as the Internet or an intranet through the communication interface 96. The computer 90 is connected to a server and a computer in an upper system through the network and acquires a phase distribution of a basic image and target image information from the upper system.

The processor 91 loads a program stored in the auxiliary storage device 93 or the like into the main storage device 92 and executes the loaded program. The configuration according to the present example embodiment may use a software program installed on the computer 90. The processor 91 performs the arithmetic processing and control processing by the control means according to the present example embodiment.

The main storage device 92 includes an area into which a program is loaded. For example, the main storage device 92 may be a volatile memory such as a dynamic random access memory (DRAM). Further, a nonvolatile memory such as a magnetoresistive random access memory (MRAM) may be configured or added as the main storage device 92.

The auxiliary storage device 93 is a means that stores data such as a phase distribution of a basic image. The auxiliary storage device 93 includes a local disk such as a hard disk or a flash memory. Furthermore, a phase distribution of a basic image may be configured to be stored in the main storage device 92, and the auxiliary storage device 93 may be omitted.

The input-output interface 95 is a device connecting the computer 90 to peripheral equipment, in accordance with a connection standard. The communication interface 96 is an interface for connecting to the network such as the Internet or an intranet. Note that an interface is abbreviated to I/F in FIG. 33. The input-output interface 95 and the communication interface 96 may be made common as an interface connected to external equipment.

The computer 90 may be configured to be capable of connecting to input equipment such as a keyboard, a mouse, and a touch panel as needed. The input equipment is used for input of information and a setting. Furthermore, when a touch panel is used as the input equipment, a display screen of display equipment may be configured to also serve as an interface of the input equipment. Data exchange between the processor 91 and the input equipment may be mediated by the input interface 95.

The communication interface 96 is connected to an upper system such as another computer or a server through the network. The upper system transmits a phase distribution of a basic image used by the respective example embodiments to the computer 90 through the communication interface 96. Further, the upper system transmits target image information used by the respective example embodiments to the computer 90 through the communication interface 96. The upper system may generate a phase distribution of a basic image used by the respective example embodiments in the local device or acquire the phase distribution from another device.

Further, the computer 90 may be equipped with display equipment for displaying information. When display equipment is equipped, it is preferable that the computer 90 be provided with a display control device (unillustrated) for controlling display by the display equipment. The display equipment may be connected to the computer 90 through the input interface 95.

Further, the computer 90 may be equipped with a reader-writer as needed. The reader-writer is connected to the bus 99 and mediates, between the processor 91 and an unillustrated recording medium (program recording medium), reading of data and a program from the recording medium, writing of a processing result by the computer 90 to the recording medium, and the like. For example, the recording medium can be provided by semiconductor recording medium such as a secure digital (SD) card or a universal serial bus (USB) memory, or the like. Further, the recording medium 516 may be provided by a magnetic recording medium such as a flexible disk, an optical recording medium such as a compact disk (CD) or a digital versatile disc (DVD), or another recording medium.

The above is an example of a hardware configuration enabling the control means according to the example embodiments of the present invention. Note that the hardware configuration illustrated in FIG. 33 is an example of a hardware configuration for enabling the projection device according to the present example embodiment and does not limit the scope of the present invention. Further, a processing program causing the computer to perform processing by the projection device according to the present example embodiment is also included in the scope of the present invention. Additionally, a program recording medium recording the processing program according to the example embodiments of the present invention is also included in the scope of the present invention.

While the present invention has been described above with reference to the example embodiments, the present invention is not limited to the aforementioned example embodiments. Various changes and modifications that can be understood by a person skilled in the art may be made to the configurations and details of the present invention, within the scope of the present invention.

This application is based upon and claims the benefit of priority from Japanese Patent Application No. 2015-125298, filed on Jun. 23, 2015, the disclosure of which is incorporated herein in its entirety by reference.

REFERENCE SIGNS LIST

1 Projection device
11 Light source
12 Collimator lens
13 Spatial modulation element
15 Projection means
16 Fourier transform lens
17 Aperture
18 Projection lens
20 Basic image processing means
21 Basic image storage unit
23 Image acquisition unit
25 Conversion processing unit
27 Output unit
40 Modulation element control means
100 Projection system
102 Server
111 Control device
112 Imaging device
113 Projection device

What is claimed is:

1. A projection device comprising:
a projection unit that includes
a light source,
a spatial modulation element including display part that displays a phase distribution of a target image and reflecting light from the light source, and
an opening frame through which reflected light from the spatial modulation element passes; and
a controller that causes the display part of the spatial modulation element to display a phase distribution generated by using an amplitude distribution set with a signal region in which a basic figure included in the target image is arranged and a sweep-out region for sweeping optical noise out of the signal region, wherein the controller is configured to record the phase distribution of a basic image in which the sweep-out region is set around the signal region.

2. The projection device according to claim 1, wherein the controller includes:
a basic image processor that generates a phase distribution of a target image in which the basic figure is arranged at a desired arranged position on a projection surface, by storing a phase distribution of a basic image in which the basic figure is arranged and performing conversion processing on a phase distribution of the basic image in such a way that a sweep-out region set into the basic image is positioned in a frame part of the opening frame; and
a modulation element controller that causes the display part of the spatial modulation element to display a phase distribution generated by the basic image processor.

3. The projection device according to claim 2, wherein the basic image processor includes:
   a basic image memory that stores a phase distribution of the basic image;
   an image acquisition unit that acquires a phase distribution of the basic image from the basic image memory;
   a conversion processor that performs conversion processing on a phase distribution of the basic image in such a way that a sweep-out region set into the basic image is positioned in a frame part of the opening frame; and
   an output unit that outputs a phase distribution on which conversion processing is performed by the conversion processor to the modulation element controller.

4. The projection device according to claim 3, wherein the basic image memory
   stores phase distributions of a plurality of basic images, in each of which at least one of the basic figure is arranged for each of a plurality of arranged positions set in the signal region.

5. The projection device according to claim 4, wherein, by the conversion processor performing conversion processing on any of phase distributions of the basic figures stored in the basic image memory, the basic image memory
   stores a phase distribution of the basic image in such a way that the basic figure can be displayed at every position in the signal region.

6. The projection device according to claim 4, wherein the opening frame is formed rectangularly.

7. The projection device according to claim 6, wherein the basic image memory
   records a phase distribution of a basic image in which the sweep-out region is set around the rectangular signal region.

8. The projection device according to claim 6, wherein the basic image memory
   records a phase distribution of a basic image in which the sweep-out regions are set along two sides of the rectangular signal region, the sides facing one another.

9. The projection device according to claim 8, wherein the basic image memory
   records phase distributions of a plurality of basic images, in each of which at least one of the basic figure is arranged for each of a plurality of arranged positions set by closely arranging the basic figures in a direction perpendicular to two sides of the rectangular signal region, the sides facing one another.

10. The projection device according to claim 4, wherein the opening frame is formed circularly.

11. The projection device according to claim 10, wherein the basic image memory
    records a phase distribution of a basic image in which the sweep-out region is set around the circular signal region.

12. The projection device according to claim 4, wherein the basic image memory
    records a basic image table storing a phase distribution of a basic image in which the basic figure is arranged in association with the plurality of arranged positions.

13. The projection device according to claim 3, wherein the basic image memory
    stores phase distributions of a plurality of basic images, in each of which at least one of the basic figure is arranged for each of a plurality of arranged positions set by closely arranging the basic figures in the signal region.

14. The projection device according to claim 3, wherein, by performing phase shift calculation on a phase distribution of the basic image, the conversion processor generates a phase distribution of a basic image in which the basic figure is arranged at a different position in the signal region.

15. The projection device according to claim 3, wherein, by performing rotation processing on a phase distribution of the basic image, the conversion processor
    generates a phase distribution of a basic image in which the basic figure is arranged at a different position in the signal region.

16. A projection system comprising:
    a projection device including
      a projection unit that includes
        a light source,
        a spatial modulation element including display part that displays a phase distribution of a target image and reflecting light from the light source, and
        an opening frame through which reflected light from the spatial modulation element passes, and
      a controller that causes the display part of the spatial modulation element to display a phase distribution generated by using an amplitude distribution set with a signal region in which a basic figure included in the target image is arranged and a sweep-out region for sweeping optical noise out of the signal region, wherein the controller is configured to record the phase distribution of a basic image in which the sweep-out region is set around the signal region; and
    a basic image generation unit that sets the signal region and the sweep-out region into an amplitude distribution of a basic image including the basic figure, and generates a phase distribution of a basic image in which the basic figure is arranged at some position in the signal region.

17. The projection system according to claim 16, further comprising a server including the basic image generation unit, wherein
    the server is connected to the projection device through a network.

18. An interface apparatus comprising:
    an imaging device capturing a manipulation region in which an interface manipulation is performed;
    a projection device including
      a projection unit that includes
        a light source,
        a spatial modulation element including display part that displays a phase distribution of a target image and reflecting light from the light source, and
        an opening frame through which reflected light from the spatial modulation element passes, and
      a controller that causes the display part of the spatial modulation element to display a phase distribution generated by using an amplitude distribution set with a signal region in which a basic figure included in the target image is arranged and a sweep-out region for sweeping optical noise out of the signal region, wherein the controller is configured to record the phase distribution of a basic image in which the sweep-out region is set around the signal region; and
    a control device acquiring an image captured by the imaging device, recognizing a manipulation by a manipulator, the manipulation being included in the image, and performing control of causing the projection device to project the target image, based on the recognition result.

* * * * *